US009200169B2

(12) United States Patent
Nonogaki et al.

(10) Patent No.: US 9,200,169 B2
(45) Date of Patent: Dec. 1, 2015

(54) INKJET RECORDING INK, INK CARTRIDGE, AND INKJET RECORDING METHOD

(71) Applicants: Masayasu Nonogaki, Shizuoka (JP); Mitsuru Naruse, Shizuoka (JP); Minoru Hakiri, Shizuoka (JP); Keita Katoh, Shizuoka (JP)

(72) Inventors: Masayasu Nonogaki, Shizuoka (JP); Mitsuru Naruse, Shizuoka (JP); Minoru Hakiri, Shizuoka (JP); Keita Katoh, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 13/826,300

(22) Filed: Mar. 14, 2013

(65) Prior Publication Data

US 2013/0242013 A1    Sep. 19, 2013

(30) Foreign Application Priority Data

Mar. 19, 2012 (JP) .................................. 2012-061815
Dec. 19, 2012 (JP) .................................. 2012-276520

(51) Int. Cl.
| | |
|---|---|
| *B41J 2/17* | (2006.01) |
| *C09D 11/30* | (2014.01) |
| *B41J 2/21* | (2006.01) |
| *C09D 11/106* | (2014.01) |
| *C09D 11/322* | (2014.01) |

(52) U.S. Cl.
CPC . *C09D 11/30* (2013.01); *B41J 2/17* (2013.01); *B41J 2/2107* (2013.01); *C09D 11/106* (2013.01); *C09D 11/322* (2013.01)

(58) Field of Classification Search
CPC .......... B41J 2/17; B41J 2/17503; B41J 2/015; B41J 2/2107; C09D 11/30; C09D 11/32; C09D 11/322; C09D 11/324; C09D 11/326; C09D 11/40; C09D 11/106; C09D 17/001; B41M 5/0023
USPC ........... 347/20, 54, 84, 86, 95–100; 106/31.6, 106/31.75
See application file for complete search history.

(56) References Cited

U.S. PATENT DOCUMENTS

| | | | |
|---|---|---|---|
| 7,101,919 B2 | 9/2006 | Hasegawa et al. | |
| 7,798,629 B2 | 9/2010 | Hakiri et al. | |
| 8,197,049 B2 | 6/2012 | Hakiri et al. | |
| 8,241,462 B2 * | 8/2012 | Sakai et al. ................ | 162/168.1 |
| 8,247,473 B2 | 8/2012 | Naruse et al. | |
| 2003/0196571 A1 | 10/2003 | Hakiri et al. | |
| 2006/0209149 A1 | 9/2006 | Hasegawa et al. | |
| 2006/0272543 A1 | 12/2006 | Hakiri et al. | |
| 2007/0222832 A1 * | 9/2007 | Yahiro ............................. | 347/85 |
| 2008/0036830 A1 | 2/2008 | Natori et al. | |
| 2009/0043028 A1 * | 2/2009 | Matsuyama et al. .......... | 524/377 |
| 2010/0302306 A1 | 12/2010 | Hasegawa et al. | |
| 2010/0309260 A1 | 12/2010 | Hakiri et al. | |
| 2011/0074865 A1 | 3/2011 | Hasegawa et al. | |
| 2011/0164086 A1 | 7/2011 | Ggoto et al. | |
| 2011/0257289 A1 * | 10/2011 | Biggs et al. ................... | 523/102 |
| 2011/0267398 A1 | 11/2011 | Hakiri et al. | |
| 2012/0026237 A1 | 2/2012 | Hakiri et al. | |
| 2012/0062646 A1 | 3/2012 | Hasegawa et al. | |
| 2012/0092411 A1 | 4/2012 | Hakiri et al. | |
| 2012/0098883 A1 * | 4/2012 | Matsuyama et al. ............ | 347/21 |
| 2012/0154492 A1 | 6/2012 | Hakiri et al. | |
| 2012/0188312 A1 * | 7/2012 | Nakagawa ...................... | 347/54 |
| 2012/0242741 A1 | 9/2012 | Hasegawa et al. | |
| 2012/0262518 A1 | 10/2012 | Naruse et al. | |

FOREIGN PATENT DOCUMENTS

| | | |
|---|---|---|
| CN | 102144007 A | 8/2011 |
| JP | 3155318 | 2/2001 |
| JP | 2006-016412 | 1/2006 |

OTHER PUBLICATIONS

Combined Chinese Office Action and Search Report issued Apr. 4, 2014 in Patent Application No. 201310085494.3 (with English language translation).

* cited by examiner

*Primary Examiner* — Matthew Luu
*Assistant Examiner* — Rut Patel
(74) *Attorney, Agent, or Firm* — Oblon, McClelland, Maier & Neustadt, L.L.P.

(57) ABSTRACT

An inkjet recording ink, including: water; a wetting agent; a colorant; and polymer microparticles, wherein the polymer microparticles are each a copolymer of a monomer represented by the following structural formula (1) or the following general formula (2), a monomer represented by the following general formula (3), and a macromonomer represented by the following general formula (4):

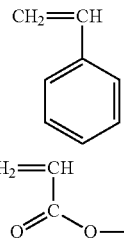 (1)
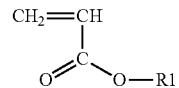 (2)
where "R1" is an alkyl group having 1 to 4 carbon atoms,
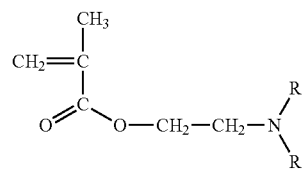 (3)
where "Rs" are independently an alkyl group having 1 to 4 carbon atoms,
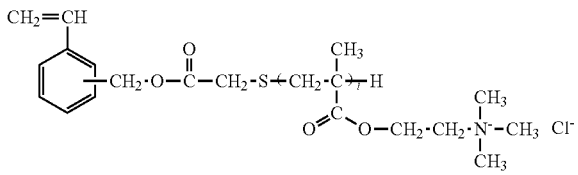 (4)
where "l" is the number of repeating units, and an integer of 1 to 100.
12 Claims, 6 Drawing Sheets

INKJET RECORDING INK, INK CARTRIDGE, AND INKJET RECORDING METHOD

BACKGROUND OF THE INVENTION

1. Field of the Invention

The present invention relates to an inkjet recording ink, ink cartridge, and inkjet recording method.

2. Description of the Related Art

In recent years, as an image formation method, an inkjet recording method has become popular because the inkjet recording method provides a simpler process than other recording methods, full color is easy to make, and high-resolution images can be obtained even by a simple device.

According to the inkjet recording method, a small amount of ink is jetted by foam generated by heat, or by pressure that is generated with the use of a piezoelectric or electrostatic force, or the like. The ink that has adhered to a recording medium such as paper is promptly dried, or penetrates into the recording medium. In this manner, an image is formed. The use of the inkjet recording method has become widespread in various fields, from personal and industrial printers to printing.

For an inkjet recording device, as a colorant, a dye ink that uses a water-soluble dye is mainly used. However, the disadvantage is that the dye ink is poor in weather resistance and water resistance. Therefore, in recent years, instead of the water-soluble dye, research on a pigment ink that uses pigment has been underway. However, the pigment ink is still poorer in color-producing performance, ink jetting stability, and storage stability than the dye ink.

As the high-quality image technology of OA printers has advanced, the pigment ink is increasingly required to have the same level of image density as the dye ink even when plain paper is used as a recording medium. However, when plain paper is used as a recording medium, the problem with the pigment ink is that the ink penetrates into the paper, resulting in a decrease in the pigment concentration of the paper surface and a drop in image density.

In recent years, in particular, demand for industrial applications has been growing, and high-speed printing has been desired. For high-speed printing, an inkjet printer with a line head is proposed. In the case of high-speed printing, in order to increase the drying speed of the ink that adheres to the recording medium, such a printer has a unit configured to speed up the drying process by adding a penetrating agent to the ink and allowing water to penetrate into the recording medium. However, at this time, the degree of penetration of pigment into the recording medium, as well as of water, becomes higher. As a result, the image density further decreases.

To improve image density, various methods are proposed. For example, the following ink is proposed (for example, see Japanese Patent Application Laid-Open (JP-A) No. 2006-16412): the ink is so formed that the viscosity-rise rate (mPa·s/%) associated with moisture evaporation of the ink is less than 5.0 mPa·s/% when the amount of moisture evaporation relative to the total weight of the ink is less than 30% by mass, and that, when the amount of moisture evaporation is between 30% by mass to 45% by mass, the viscosity-rise rate is greater than 50 mPa·s/%.

Even when the proposed ink is used for high-speed printing, the penetration of pigment into the paper is suppressed, because there is a rapid increase in the viscosity of the ink as moisture evaporates after the ink landed on the plain paper. As a result, the image density is said to be high. However, in the case of the proposed ink, there is a rapid increase in the viscosity as moisture evaporates. Therefore, if moisture evaporates in an inkjet recording device, particularly in a nozzle, an increase in viscosity causes problems, such as a reduction in ink jetting stability, or the fixing of ink around the nozzle.

Moreover, the following ink is proposed (for example, see Japanese Patent (JP-B) No. 3155318): the ink contains polymer gel microspheres that become higher in viscosity due to swelling as proton concentration moves to the acidic side. That is, when the ink is stored or is placed in a recording device, the ink is so adjusted as to have an alkaline-side proton concentration. However, after the ink landed on the plain paper, the proton concentration moves to the acidic side as protons are supplied from the recording medium, or plain paper. As a result, the polymer gel microspheres become higher in viscosity, and the penetration of pigment into the paper is said to be suppressed. According to the proposal, even if moisture evaporates in a nozzle of an inkjet recording device, there is no increase in viscosity, and the ink jetting stability does not become lower. However, the image density is insufficient, and there is still room for further improvement.

SUMMARY OF THE INVENTION

The present invention is intended to solve various conventional problems, and achieve the following object. That is, the object of the present invention is to provide an inkjet recording ink that is excellent in storage stability, is able to obtain high image density on plain paper, is excellent in jetting stability of ink from a recording head, and does not allow the fixation of ink around the nozzle.

The means for achieving the above object are as follows:

An inkjet recording ink of the present invention contains: water; a wetting agent; a colorant; and polymer microparticles, wherein the polymer microparticles are each a copolymer of a monomer represented by the following structural formula (1) or the following general formula (2), a monomer represented by the following general formula (3), and a macromonomer represented by the following general formula (4).

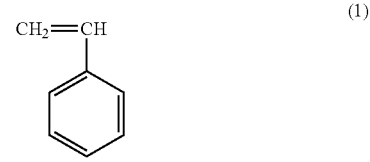

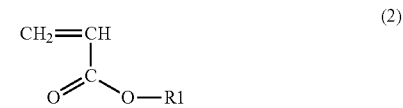

In the general formula (2), "R1" is an alkyl group having 1 to 4 carbon atoms.

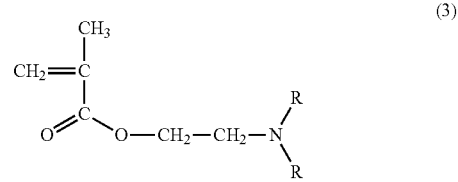

In the general formula (3), "Rs" are independently an alkyl group having 1 to 4 carbon atoms.

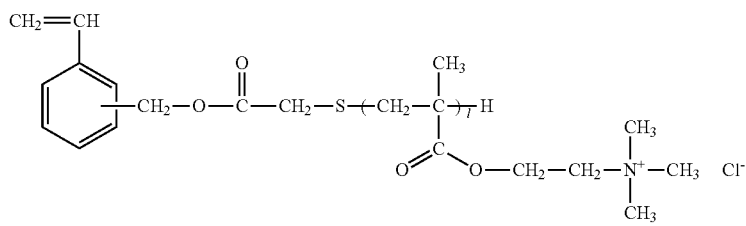

(4)

In the general formula (4), "l" is the number of repeating units, and an integer of 1 to 100.

According to the present invention, it is possible to solve the various conventional problems, and provide an inkjet recording ink that is excellent in storage stability, is able to obtain high image density on plain paper, is excellent in jetting stability of ink from a recording head, and does not allow the fixation of ink around the nozzle.

Figure 1A:
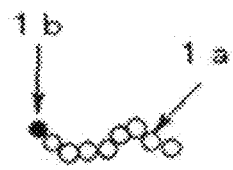
FIGS. 1A to 1F are each a schematic diagram illustrating a generation process of polymer microparticles that are used for an inkjet recording ink according to the present invention.

DETAILED DESCRIPTION OF THE INVENTION (Inkjet Recording Ink)

An inkjet recording ink (also referred to as "ink," hereinafter) of the present invention contains: water; a wetting agent; a colorant; and polymer microparticles; and may further contain other ingredients when necessary.

In the case of the inkjet recording ink of the present invention, when the polymer microparticle has landed on a recording medium such as plain paper, the diameter of the particle becomes larger, thereby suppressing the penetration of ink into the paper. As a result, high image density can be obtained.

<Polymer Microparticles>

The polymer microparticles are each a copolymer of a monomer represented by the following structural formula (1) or the following general formula (2), a monomer represented by the following general formula (3), and a macromonomer represented by the following general formula (4).

The polymer microparticles may also be referred to as "pH-responsive polymer microparticle(s)," hereinafter.

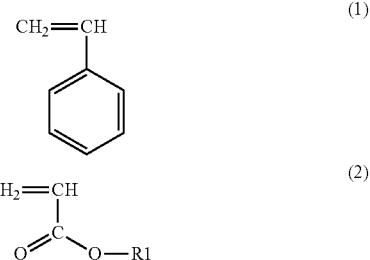

(1)

(2)

In the general formula (2), "R1" is an alkyl group having 1 to 4 carbon atoms.

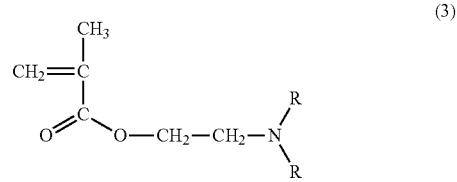

(3)

In the general formula (3), "Rs" are independently an alkyl group having 1 to 4 carbon atoms.

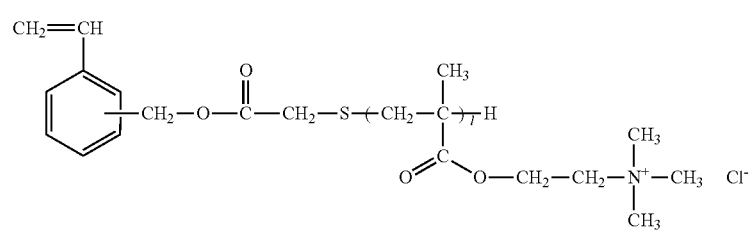

(4)

In the general formula (4), "l" is the number of repeating units, and an integer of 1 to 100.

—Monomer Represented by General Formula (2)—

The monomer represented by the general formula (2) is not particularly limited so long as "R1" is an alkyl group having 1 to 4 carbon atoms. The monomer may be appropriately selected depending on the intended purpose. For example, the following are available: those having, as R1, a methyl group, an ethyl group, a propyl group, or a butyl group.

—Monomer Represented by General Formula (3)—

The monomer represented by the general formula (3) is not particularly limited so long as "Rs" are independently an alkyl group having 1 to 4 carbon atoms. The monomer may be appropriately selected depending on the intended purpose. For example, the following are available: those the Rs of which are independently a methyl group, an ethyl group, a propyl group, or a butyl group. Among the above substances, those the Rs of which are independently a methyl group or an ethyl group are preferred.

—Macromonomer Represented by General Formula (4)—

The macromonomer represented by the general formula (4) is not particularly limited so long as repeating unit 1 is an integer of 1 to 100. The macromonomer may be appropriately selected depending on the intended purpose. However, those with "l" of 1 to 50 are preferred.

Hereinafter, the monomer represented by the structural formula (1) or the general formula (2) may be referred to as "hydrophobic monomer"; the monomer represented by the general formula (3) as "pH-sensitive monomer"; and the macromonomer represented by the general formula (4) as "hydrophilic macromonomer."

When the inkjet recording ink has landed on the recording medium such as plain paper, the polymer microparticle has such properties as to become larger in particle diameter as the pH changes (to the acidic side). The functionality makes it possible to obtain high image density as the penetration of ink into the paper is suppressed.

FIGS. 1A to 1F are each a schematic diagram showing a generation process of the polymer microparticle that is a copolymer of a hydrophobic monomer represented at least by the structural formula (1) or the general formula (2), a pH-sensitive monomer represented by the general formula (3), and a hydrophilic macromonomer represented by the general formula (4).

With reference to the schematic diagram of FIGS. 1A to 1F, the generation process of the polymer microparticle will be described.

What is shown in FIGS. 1A to 1F is an example in which the following substances are used as raw materials: styrene, which is a hydrophobic monomer; dimethylaminoethyl methacrylate, which is a pH-sensitive monomer; and a cationic hydrophilic macromonomer, which is synthesized from methacryloyloxyethyl trimethyl ammonium chloride and which has a radically polymerizable group at a terminal.

The cationic hydrophilic macromonomer ("1" in FIG. 1B) that has a radically polymerizable group at a terminal includes a methacryloyloxyethyl trimethyl ammonium chloride unit ("1a" in FIG. 1A), and a vinylbenzyl group ("1b" in FIG. 1A).

Figure 1B:
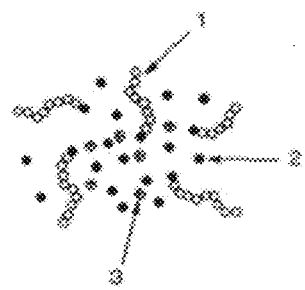
Figure 1C:
Figure 1D:
Figure 1E:
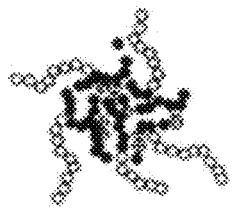
Figure 1F:
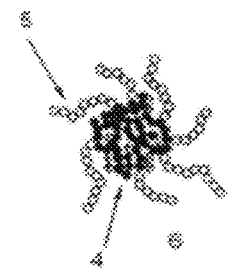

First, the cationic hydrophilic macromonomer (1), a styrene monomer ("2" in FIG. 1B), and dimethylaminoethyl methacrylate ("3" in FIG. 1B) are mixed (step A as shown in FIG. 1B), and the styrene monomer (2) and the dimethylaminoethyl methacrylate (3) are polymerized. At this time, copolymerization of the styrene monomer (2) and the dimethylaminoethyl methacrylate (3) (step B as shown in FIG. 1C) partially takes place. However, copolymerization with the vinylbenzyl group (1b) (step C as shown in FIG. 1D) takes place at the same time. As a result of the copolymerization, a polymer is obtained: the polymer appears to have a structure in which the cationic macromonomer is grafted into the copolymer of styrene and dimethylaminoethyl methacrylate. The reaction takes place in a polar medium. Therefore, the hydrophobic styrene units are selectively integrated (or localized) on the inner side, and the cationic macromonomer (1) on the outer side (step D as shown in FIG. 1E). After polymerization is completed as described above, a polymer microparticle ("6" in FIG. 1F) is obtained (step E as shown in FIG. 1F): Cationic polymer chains ("5" in FIG. 1F) are positioned on a surface of a core portion ("4" in FIG. 1F) of a styrene/dimethylaminoethyl methacrylate unit.

In that manner, the polymer microparticle that is used in the present invention has the following structure as a hydrophobic monomer, a pH-sensitive monomer, and a hydrophilic macromonomer are copolymerized: A hydrophobic polymer and a pH-sensitive polymer make up a core of a polymer microparticle, and polymer chains of a hydrophilic macromonomer are localized on the surface of the polymer microparticle core.

In general, the pH of a surface of plain paper is 4 to 7. When the inkjet recording ink has landed on the plain paper, the ink moves to the acidic side as protons are supplied. Accordingly, the polymer microparticle having the above structure is being dispersed in the ink that is stored or placed in a recording device. However, after the ink has landed on the plain paper, the pH of the ink is changed to the acidic side. Then, the hydrophobic polymer becomes hydrophilic due to the pH-sensitive polymer of the core portion of the polymer microparticle. As a result, the core portion swells, resulting in an increase in the particle diameter.

That is, in response to a change in the pH (a decline in the value of the pH: a change toward the acidic side), the inkjet recording ink that has landed on the plain paper stays on the surface of the paper as the polymer microparticle becomes larger in diameter. As a result, on the surface of the paper, the concentration of the colorant becomes higher, resulting in an increase in the image density.

The ratio of the following structural units that make up the polymer microparticle is not particularly limited: a structural unit (hydrophobic monomer) represented by the structural formula (1) or the general formula (2); a structural unit (pH-sensitive monomer) represented by the general formula (3); and a structural unit (hydrophilic macromonomer) represented by the general formula (4). The ratio may be appropriately selected depending on the intended purpose. However, in terms of pH-responsiveness, the ratio of the following factors is preferably 1:(0.1 to 5):(0.1 to 5), more preferably 1:(0.5 to 3):(0.5 to 3): the hydrophobic monomer, the pH-sensitive monomer, and the repeating units that constitute polymer chains localized on the surface of the polymer microparticle in the hydrophilic macromonomer.

The amount of the polymer microparticles contained is not particularly limited. The amount may be appropriately selected depending on the intended purpose. However, relative to the total amount of the ink, the amount of the polymer microparticles contained is preferably 0.05% by mass to 2.0% by mass as a solid content thereof. If the amount contained is less than 0.05% by mass, an increase in the particle diameter may not be obtained by a sufficient pH response, and the ink may penetrate into the recording medium. If the amount contained is greater than 2.0% by mass, the polymer microparticles may be agglutinated together. In this case, the viscosity of the ink rises, and it may be difficult to have the viscosity of the ink that an inkjet recording device is able to jet.

The volume average particle diameter (D50) of the polymer microparticle is not particularly limited and may be appropriately selected depending on the intended purpose. At pH 8.5 or higher, the volume average particle diameter is preferably 10 nm to 300 nm. If the volume average particle diameter is less than 10 nm, the viscosity of the polymer microparticle itself is so high that it may be difficult to have the viscosity of the ink that an inkjet recording device is able to jet. If the volume average particle diameter is greater than 300 nm, a nozzle of an inkjet recording device can be clogged with the particles, possibly causing jetting failure.

For example, the volume average particle diameter (D50) of the polymer microparticle is measured by a dynamic light scattering method with the use of Zetasizer Nano ZS (manufactured by Malvern).

<Water>

The water is not particularly limited and may be appropriately selected depending on the intended purpose. Examples thereof include pure water, such as ion-exchanged water, ultrafiltered water, reverse osmosis water, and distilled water; and ultrapure water.

The amount of the water contained is not particularly limited. The amount may be appropriately selected depending on the intended purpose. Relative to the total amount of the ink, the amount of the water contained is preferably 20% by mass to 60% by mass.

<Wetting Agent>

The wetting agent is necessary for improving the jetting stability by adding moistening effects in the inkjet recording ink.

The wetting agent is not particularly limited and may be appropriately selected depending on the intended purpose. Examples thereof include polyhydric alcohols, such as ethylene glycol, diethylene glycol, 1,3-butanediol, 3-methyl-1,3-butyl glycol, triethylene glycol, polyethylene glycol, polypropylene glycol, 1,5-pentanediol, 1,6-hexane diol, glycerin, 1,2,6-hexanetriol, 2-ethyl-1,3-hexane diol, 2,2,4-trimethyl-1,3-pentanediol, 1,2,4-butanetriol, 1,2,3-butanetriol, and petriol; polyhydric alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers, such as ethylene glycol monophenyl ether, and ethylene glycol monobenzyl ether; nitrogen-containing heterocyclic compounds, such as 2-pyrrolidone, N-methyl-2-pyrrolidone, N-hydroxyethyl-2-pyrrolidone, 1,3-dimethylimidazolidinone, ε-caprolactam, and γ-butyrolactone; amides, such as formamide, N-methylformamide, and N,N-dimethylformamide; amines, such as monoethanolamine, diethanolamine, and triethylamine, and sulfur-containing compounds, such as dimethyl sulfoxide, sulfolane, and thiodiethanol; and propylene carbonate and ethylene carbonate. One of the above wetting agents may be used independently, or two or more of the above wetting agents may be used in combination. Among the above wetting agents, in terms of being highly effective in preventing jetting failure associated with moisture evaporation, the following are preferred: 1,3-butanediol, diethylene glycol, 2,2,4-trimethyl-1,3-pentanediol, triethylene glycol, and glycerin.

The amount of the wetting agent contained is not particularly limited. The amount may be appropriately selected depending on the intended purpose. Relative to the total amount of the ink, the amount of the wetting agent contained is preferably 10% by mass to 50% by mass. If the amount contained is less than 10% by mass, the moisture of the ink is likely to evaporate. In this case, as the moisture of the ink evaporates in an ink supply system of an inkjet recording device, the ink supply system may be clogged with the thickened ink, or any other problem may arise. If the amount contained is greater than 50% by mass, the inkjet recording device is unlikely to be clogged with the thickened ink. However, in order to achieve a desired viscosity of the ink, the amount of solids such as pigment and resin may need to be reduced. In this case, the image density of the recorded matter may decrease.

<Colorant>

The colorant is not particularly limited and may be appropriately selected depending on the intended purpose. Examples thereof include inorganic pigments and organic pigments. One of the above substances may be used independently, or two or more of the above substances may be used in combination.

Examples of the inorganic pigment include titanium oxide, iron oxide, calcium carbonate, barium sulfate, aluminum hydroxide, barium yellow, navy blue, cadmium red, chrome yellow, metal powder, and carbon black. One of the above substances may be used independently, or two or more of the above substances may be used in combination. Among the above substances, carbon black is preferred.

Examples of the organic pigment include azo pigment, azomethine pigment, polycyclic pigment, dye chelate, nitro pigment, nitroso pigment, and aniline black. One of the above substances may be used independently, or two or more of the above substances may be used in combination. Among the above substances, the azo pigment and the polycyclic pigment are preferred.

Examples of the azo pigment include azo lake, insoluble azo pigment, condensed azo pigment, and chelate azo pigment.

Examples of the polycyclic pigment include phthalocyanine pigment, perylene pigment, perinone pigment, anthraquinone pigment, quinacridone pigment, dioxazine pigment, indigo pigment, thioindigo pigment, isoindolinone pigment, quinophthalone pigment, and rhodamine B lake pigment.

Examples of the dye chelate include basic dye-type chelate and acid dye-type chelate.

Black pigments are not particularly limited. The black pigments may be appropriately selected depending on the intended purpose.

Examples thereof include carbon blacks (C.I. Pigment Black 7), such as furnace black, lampblack, acetylene black, and channel black; metals, such as copper, iron (C.I. Pigment Black 11), and titanium oxide; organic pigments, such as aniline black (C.I. Pigment Black 1).

Examples of the carbon black include those produced by known methods, such as a contact method, a furnace method, a thermal method, and a channel method. Among the above substances, the following are preferred: carbon blacks produced by the furnace method or channel method, with a primary particle diameter of 15 nm to 40 nm, a BET-method specific surface area of 50 $m^2/g$ to 300 $m^2/g$, a DBP oil absorption amount of 40 mL/100 g to 150 mL/100 g, a volatile matter content of 0.5% to 10%, and a pH value of 2 to 9.

As for the carbon black, commercialized products are available. As for the commercialized products, for example, the following are available: No. 2300, No. 900, MCF-88, No. 33, No. 40, No. 45, No. 52, MA7, MA8, MA100, and No. 2200B (all manufactured by Mitsubishi Chemical Corporation); RAVEN 700, RAVEN 5750, RAVEN 5250, RAVEN 5000, RAVEN 3500, and RAVEN 1255 (all manufactured by Columbia Corp); REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 400 (all manufactured by Cabot Corporation); and COLOR BLACK FW1, COLOR BLACK FW2, COLOR BLACK FW2V, COLOR BLACK FW18, COLOR BLACK FW200, COLOR BLACK S150, COLOR BLACK 5160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (all manufactured by Degussa).

A pigment for color that can be used in yellow ink is not particularly limited. The pigment may be appropriately selected depending on the intended purpose. For example, the following are available: C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

A pigment for color that can be used in magenta ink is not particularly limited and may be appropriately selected depending on the intended purpose. Examples thereof include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

A pigment for color that can be used in cyan ink is not particularly limited and may be appropriately selected depending on the intended purpose. Examples thereof include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, and C.I. Pigment Blue 66; and C.I. Bat Blue 4 and C.I. Bat Blue 60.

As for a pigment that is contained in each ink used in the present invention, new ones that are produced for the present invention are also available.

Incidentally, the use of Pigment Yellow 74 as yellow pigment, Pigment Red 122 and Pigment Violet 19 as magenta pigments, and Pigment Blue 15:3 as cyan pigment makes it possible to obtain a balanced ink that is excellent in color tone and light resistance.

The amount of the colorant used in the present invention that is contained in the recording ink is not particularly limited. The amount may be appropriately selected depending on the intended purpose. It is preferred that the amount be greater than or equal to 0.1% by mass and less than or equal to 20.0% by mass. The volume average particle diameter (D50) of the pigment is preferably less than or equal to 150 nm.

The volume average particle diameter (D50) of the pigment is measured by a dynamic light scattering method in the following environment: 23° C., and 55% RH. For the measurement by the dynamic light scattering method, for example, MICROTRAC UPA (manufactured by Nikkiso Co., Ltd.) can be used.

<Other Ingredients>

The other ingredients are not particularly limited so long as the effects of the present invention are not hampered. The other ingredients may be appropriately selected depending on the intended purpose. Examples of the other ingredients include a dispersing agent, a penetrating agent, a pH adjusters, a water-dispersible resin, a preservative/fungicide, a chelating reagent, a rust preventive agent, an antioxidizing agent, a ultraviolet absorber, an oxygen absorbers, and a light stabilizer.

—Dispersing Agent—

The dispersing agent is not particularly limited and may be appropriately selected depending on the intended purpose. Examples thereof include various surfactants, such as anionic surfactant, cationic surfactant, amphoteric surfactant, and nonionic surfactant; and dispersing agents of a polymer type. One of the above substances may be used independently, or two or more of the above substances may be used in combination.

—Anionic Surfactant—

Examples of the anionic surfactant include alkyl sulfocarboxylate, α-olefin sulfonate, polyoxyethylene alkyl ether acetate, N-acylamino acid and salts thereof, N-acyl methyl taurine salt, polyoxyalkyl ether sulfate, polyoxyethylene alkyl ether phosphate, rosin acid soap, castor-oil sulfuric acid ester salt, lauryl alcohol sulfuric acid ester salt, alkylphenol type phosphate ester, naphthalenesulfonate formalin condensate, alkyl-type phosphate ester, alkyl aryl sulfonate, diethyl sulfosuccinate, diethyl hexyl sulfosuccinate, and dioctyl sulfosuccinate.

—Cationic Surfactant—

Examples of the cationic surfactant include 2-vinylpyridine derivative and poly-4-vinylpyridine derivative.

—Amphoteric Surfactant—

Examples of the amphoteric surfactant include lauryl dimethylamino acetic acid betaine, 2-alkyl-N-carboxymethyl-N-hydroxyethylimidazolinium betaine, coconut oil fatty acid amide propyl dimethylamino acetic acid betaine, polyoctyl polyaminoethyl glycine, and imidazoline derivative.

—Nonionic Surfactant—

Examples of the nonionic surfactant include ether-based surfactants, such as polyoxyethylene nonylphenyl ether, polyoxyethylene octylphenyl ether, polyoxyethylene dodecyl phenyl ether, polyoxyethylene lauryl ether, polyoxyethylene oleyl ether, polyoxyethylene alkyl ether, and polyoxyarylkyl alkyl ether; ester-based surfactants, such as polyoxyethylene oleic acid, polyoxyethylene oleic acid ester, polyoxyethylene distearate ester, sorbitan laurate, sorbitan monostearate, sorbitan monooleate, sorbitan sesquioleate, polyoxyethylene monooleate, and polyoxyethylene stearate; and acetylene glycol-based surfactants, such as 2,4,7,9-tetramethyl-5-decyne-4,7-diol, 3,6-dimethyl-4-octyne-3,6-diol, and 3,5-dimethyl-1-hexyne-3-ol.

—Penetrating Agent—

The penetrating agent is not particularly limited and may be appropriately selected depending on the intended purpose. Examples thereof include polyol compounds having 8 to 11 carbon atoms, and glycol ether compounds having 8 to 11 carbon atoms.

The penetrating agent is different from the wetting agent. The penetrating agent is relatively smaller in wettability than the wetting agent. Therefore, it can be said that the penetrating agent is a "non-wetting medium." Examples of the non-wetting penetrating agent, the following are preferred: those with a solubility of 0.2% by mass to 5.0% by mass in water at 25° C. Among the substances, the following are more preferred: 2-ethyl-1,3-hexane diol [Solubility: 4.2% by mass (25° C.)], and 2,2,4-trimethyl-1,3-pentanediol [Solubility: 2.0% by mass (25° C.)].

Examples of other polyol compounds include aliphatic diols, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexane diol, and 5-hexene-1,2-diol.

The other penetrating agents are not particularly limited so long as the penetrating agents can be dissolved in the ink and adjusted to desired physical properties. The penetrating agents may be appropriately selected depending on the intended purpose. Examples thereof include polyhydric alcohol alkyls and aryl ethers, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether, and lower alcohols, such as ethanol.

The amount of the penetrating agent contained in the inkjet recording ink is preferably 0.1% by mass to 4.0% by mass. If the amount contained is less than 0.1% by mass, the ink may not be able to dry quickly, resulting in a blurred image. If the amount contained is greater than 4.0% by mass, the dispersion stability of the colorant can be lost. In this case, a nozzle is likely to become clogged with the ink, or the ink is likely to penetrate deeper into the recording media (recording medium) than needed, possibly leading to a decrease in the image density or the occurrence of strike-through.

—pH Adjuster—

The pH adjusters are not particularly limited so long as the pH adjusters are able to adjust the pH to 8.5 to 11, preferably 9 to 11, without having adverse effects on the inkjet recording ink. The pH adjusters may be appropriately selected depending on the intended purpose. Examples thereof include alcohol amines, hydroxides of alkali metal elements, hydroxides of ammonium, phosphonium hydroxides, and carbonates of alkali metals. If the pH is less than 8.5 or greater than 11, the amount of an inkjet head dissolved, or of an ink supply unit dissolved, is large, possibly causing alteration or leakage of the ink, jetting failure, or any other trouble. If the pH is less than 8.5, the pH of the ink may decline when the ink is stored, and the polymer microparticles may be agglutinated due to an increase in the particle diameter.

For example, the pH is measured by pH meter HM-30R (manufactured by DKK-TOA Corporation).

Examples of the alcohol amines include diethanolamine, triethanolamine, and 2-amino-2-ethyl-1,3 propanediol.

Examples of the hydroxides of alkali metal elements include lithium hydroxide, sodium hydroxide, and potassium hydroxide.

Examples of the hydroxides of ammonium include ammonium hydroxide, quaternary ammonium hydroxide, and quaternary phosphonium hydroxide.

Examples of the carbonates of alkali metals include lithium carbonate, sodium carbonate, and potassium carbonate.

—Water-Dispersible Resin—

The water-dispersible resin is not particularly limited so long as the resin is excellent in film formation performance (image formation performance), is high in water repellency, water resistance, and weather resistance, and is high in water resistance and effective in recording images of high image density (high color-producing performance). The water-dispersible resin may be appropriately selected depending on the intended purpose. Examples thereof include condensation-type synthetic resin, addition-type synthetic resin, and natural polymer compounds.

Examples of the condensation-type synthetic resin include polyester resin, polyurethane resin, polyepoxy resin, polyamide resin, polyether resin, poly (meth) acrylic resin, acryl-silicone resin, and fluorine-based resin.

Examples of the addition-type synthetic resin include polyolefin resin, polystyrene-based resin, polyvinyl alcohol-based resin, polyvinyl ester-based resin, polyacrylic acid-based resin, and unsaturated carboxylic acid-based resin.

Examples of the natural polymer compounds include celluloses, rosins, and natural rubber.

Among the above substances, the following are preferred: polyurethane resin microparticles, acryl-silicone resin microparticles, and fluorine-based resin microparticles.

The volume average particle diameter (D50) of the water-dispersible resin correlates with the viscosity of a dispersion liquid. If the composition is the same, as the particle diameter becomes smaller, the viscosity increases with the same solids. In order to keep the ink from becoming excessively higher in viscosity, it is preferred that the volume average particle diameter (D50) of the water-dispersible resin be greater than or equal to 50 nm. If the particle diameter is several dozen micrometers, the ink cannot be used because the particle diameter is larger than a nozzle opening of an inkjet head. Even when the particle diameter is smaller than the nozzle opening, the jetting stability would deteriorate if a particle of a large particle diameter exists in the ink. In order to prevent the ink jetting stability from being hampered, it is preferred that the volume average particle diameter (D50) be less than or equal to 200 nm.

The volume average particle diameter (D50) of the water-dispersible resin is measured by a dynamic light scattering method in the following environment: 23° C., and 55% RH. For the measurement by the dynamic light scattering method, for example, Microtrac UPA (manufactured by Nikkiso Co., Ltd.) can be used.

It is preferred that the water-dispersible resin work to fix the colorant on a paper surface, and form a film at normal temperatures, and improve the fixing of the colorant. Therefore, the minimum film forming temperature (MFT) of the water-dispersible resin is preferably less than or equal to 30° C.

If the glass-transition temperature of the water-dispersible resin is less than or equal to −40° C., the viscosity of the resin coating increases, thereby giving tack to printed materials. Therefore, it is preferred that the glass-transition temperature of the water-dispersible resin be greater than or equal to −30° C. The amount of the water-dispersible resin contained in the inkjet recording ink as a solid content is preferably 1% by mass to 15% by mass, more preferably 2% by mass to 7% by mass.

—Preservative/Fungicide—

Examples of the preservative/fungicide include sodium dehydroacetate, sodium sorbate, 2-pyridinethiol-1-oxide sodium, sodium benzoate, and pentachlorophenol sodium.

—Chelating Reagent—

Examples of the chelating reagent include sodium ethylenediaminetetraacetate, sodium nitrilotriacetate, hydroxyethyl ethylenediamine triacetic acid sodium, diethylenetriamine pentaacetic acid sodium, and uramil diacetic acid sodium.

—Rust Preventive Agents—

Examples of the rust preventive agents include acid sulfite, sodium thiosulfate, ammonium thiodiglycolate, diisopropyl ammonium nitrite, pentaerythritol tetranitrate, and dicyclohexyl ammonium nitrite.

—Antioxidizing Agent—

Examples of the antioxidizing agents include phenolic antioxidizing agents (including hindered phenolic antioxidizing agents), amine antioxidizing agents, sulfur antioxidizing agents, and phosphorus antioxidizing agents.

—Ultraviolet Absorbers—

Examples of the ultraviolet absorbers include benzophenone-based ultraviolet absorbers, benzotriazole-based ultraviolet absorbers, salicylate-based ultraviolet absorbers, cyanoacrylate-based ultraviolet absorber, and nickel complex salt-based ultraviolet absorbers.

<Production Method of Inkjet Recording Ink>

For example, the inkjet recording ink can be produced by dispersing or dissolving water, a wetting agent, a colorant, and a polymer microparticle (or a microparticle that becomes larger in particle diameter as the value of the pH decreases), and, if necessary, other ingredients, in an aqueous medium, and by stirring and mixing when required.

For example, the dispersing can be carried out with a sand mill, homogenizer, ball mill, paint shaker, ultrasonic dispersing device, or the like. The stirring and mixing can be carried out with a stirrer that uses a typical stirring blade, magnetic stirrer, high speed dispersing device, or the like.

<Physical Properties of Inkjet Recording Ink>

The physical properties of the inkjet recording ink are not particularly limited. The physical properties may be appropriately selected depending on the intended purpose. For example, it is preferred that the viscosity, the surface tension, and other factors be within the ranges described below.

At 25° C., the viscosity of the inkjet recording ink is preferably 3 mPa·s to 20 mPa·s. When the viscosity of the ink is 3 mPa·s or more, the ink is effective in improving the print density and the letter grade. When the viscosity of the ink is 20 mPa·s or less, it is possible to ensure the jetting performance.

For example, the viscosity is measured at 25° C. by a viscometer (RL-550, manufactured by Toki Sangyo Co., Ltd.).

The surface tension of the inkjet recording ink is preferably less than or equal to 40 mN/m at 25° C. If the surface tension is greater than 40 mN/m, the leveling of the ink on a recording medium is less likely to occur, possibly taking more time to dry.

(Ink Cartridge)

In an ink cartridge of the present invention, the inkjet recording ink of the present invention is stored in a container. The ink cartridge further includes other members, which are appropriately selected when necessary.

The container is not particularly limited. The shape, structure, size, and material of the container may be appropriately selected depending on the intended purpose. For example, the following are preferred: those at least having an ink bag made of aluminum laminated film, resin film, or the like.

Figure 2:
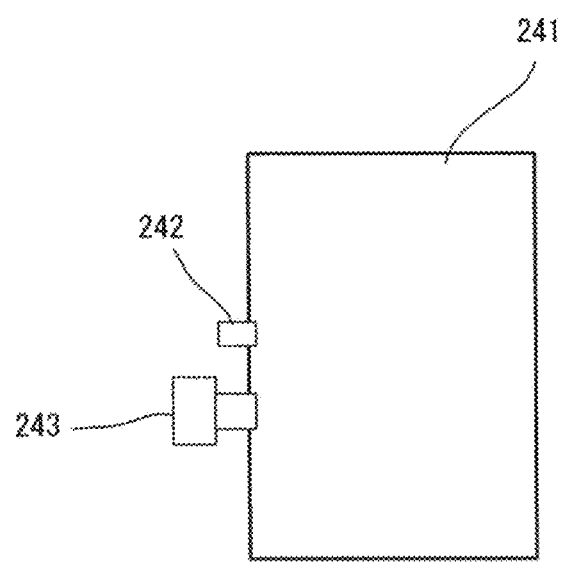
FIG. 2 is a schematic diagram illustrating one example of an ink bag of an ink cartridge according to the present invention.
Figure 3:
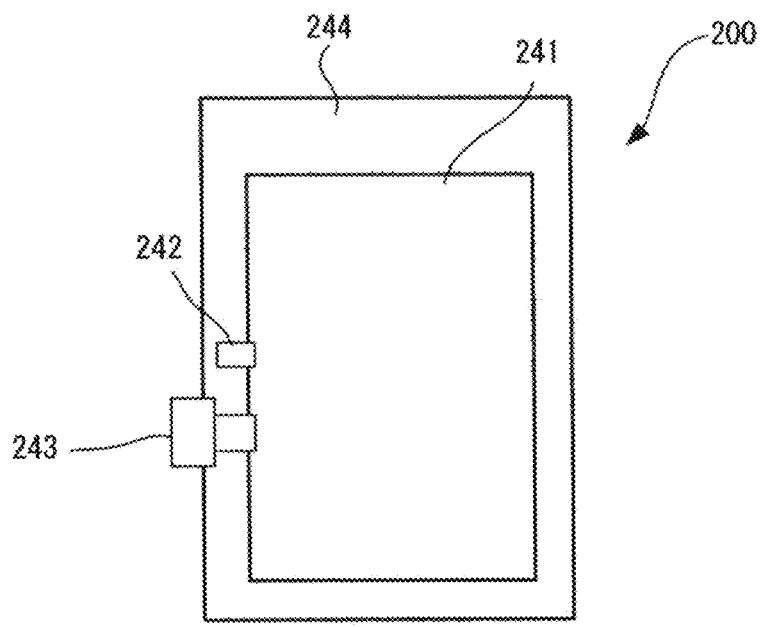
FIG. 3 is a schematic diagram showing one example of an ink cartridge of the present invention in which an ink bag is stored.

One embodiment of the ink cartridge of the present invention will be described with reference to FIGS. 2 and 3. FIG. 2 is a diagram showing one example of an ink bag of the ink cartridge of the present invention. FIG. 3 is a diagram showing a case (exterior) of the ink cartridge shown in FIG. 2.

As shown in FIG. 2, in an ink cartridge 200, an ink bag 241 is filled with ink via an ink inlet 242. After the air is discharged therefrom, the ink inlet 242 is closed by fusion. When the ink cartridge 200 is used, a needle of a device body is inserted into an ink outlet 243, which is made up of a rubber member, and the ink is supplied to the device. The ink bag 241 is made from a packaging material such as an aluminum laminated film with no air permeability. As shown in FIG. 3, the ink bag 241 is usually stored in a cartridge case 244 made of plastics. The ink bag 241 can be mounted on various inkjet recording devices for use in such a way that the ink bag 241 can be attached thereto or removed therefrom.

The inkjet recording ink of the present invention is stored in the container in a process of making an ink cartridge. Accordingly, the ink cartridge can be easily attached to, or removed from, an ink cartridge mounting portion that is provided in an inkjet recording device; the ink can be supplied over a long term in a stable manner.

(Inkjet Recording Device and Inkjet Recording Method)

An inkjet recording device of the present invention at least includes an ink jetting unit. The inkjet recording device may further include other units, which are appropriately selected when necessary, such as a stimulus generation unit and a control unit.

An inkjet recording method of the present invention at least includes an ink jetting step. The inkjet recording method may further include other steps, which are appropriately selected when necessary, such as a stimulus generation step and a control step.

The inkjet recording method of the present invention is preferably carried out by the inkjet recording device of the present invention. The ink jetting step is preferably carried out by the ink jetting unit. The other steps are preferably carried out by the other units.

<Ink Jetting Unit and Ink Jetting Step>

The ink jetting step is a step of applying a stimulus to the inkjet recording ink to jet the inkjet recording ink and form an image.

The ink jetting unit is a unit configured to apply a stimulus to the inkjet recording ink to jet the inkjet recording ink and form an image. The ink jetting unit is not particularly limited. Examples thereof include various nozzles that are used to jet the ink.

The ink jetting unit is used to apply a stimulus to the inkjet recording ink, thereby jetting the inkjet recording ink from a recording head, and recoding an image on a recording medium. As a result, it is possible to form a high-density image without ink jetting failure, because of stable ink jetting characteristics.

For example, the stimulus can be generated by the stimulus generation unit. The stimulus is not particularly limited and may be appropriately selected depending on the intended purpose. Examples thereof include heat (temperature), pressure, vibration, and light. One of the above stimuli may be used independently, or two or more of the above stimuli may be used in combination. Among the above stimuli, heat and pressure are preferred.

<Stimulus Generation Unit and Stimulus Generation Step>

Examples of the stimulus generation unit include an overheating device, a pressurizing device, a piezoelectric element, a vibration generation device, an ultrasonic oscillator, and a light. More specifically, examples thereof include a piezoelectric actuator, such as a piezoelectric element; a thermal actuator, which uses an electrothermal conversion element such as a heating resistor to make use of a change of phase resulting from film boiling of a liquid; a shape memory alloy actuator, which uses a change of metal phase resulting from a change in temperature; and an electrostatic actuator, which uses an electrostatic force. The stimulus generation step is a step carried out by the stimulus generation unit.

The way that the ink is jetted is not particularly limited. The way that the ink is jetted varies according to the type of the stimulus, or the like. For example, if the stimulus is "heat," the following method is available: a method of adding, to the ink inside a recording head, the thermal energy corresponding to a recording signal by means of a thermal head or the like, generating bubbles in the ink with the help of the thermal energy, and ejecting and jetting the ink as droplets from a nozzle opening of the recording head with the help of the pressure of the bubbles. If the stimulus is "pressure," for example, the following method is available: a method of applying voltage to a piezoelectric element that is bonded to an area called pressure chamber, which is in an ink flow path in a recording head, to deflect the piezoelectric element and reduce the volume of the pressure chamber, thereby ejecting and jetting the ink as droplets from a nozzle opening of the recording head.

<Control Unit and Control Step>

The control unit is not particularly limited so long as the control unit is able to control how each of the above units operates. The control unit may be appropriately selected depending on the intended purpose. Examples thereof include sequencers and computers. The control step is a step carried out by the control unit.

One mode for carrying out the inkjet recording method of the present invention with the use of the inkjet recording device of the present invention will be described with reference to the drawings.

Figure 4:
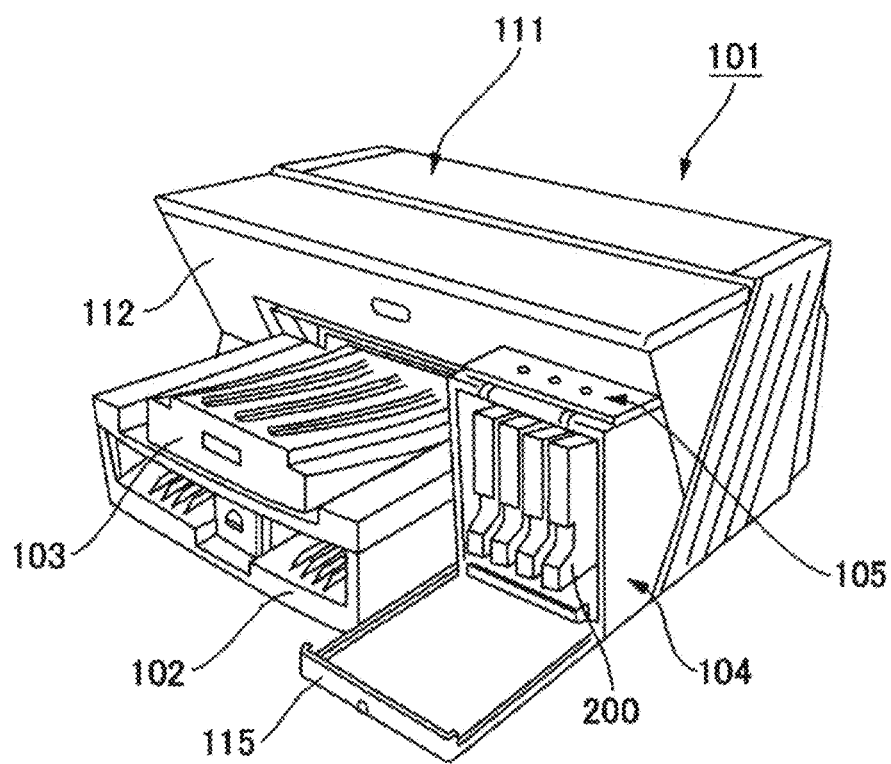
FIG. 4 is a perspective view showing one example of an inkjet recording device of the present invention.

FIG. 4 is a perspective view showing one example of an inkjet recording device (serial-type inkjet recording device) of the present invention.

An inkjet recording device shown in FIG. 4 includes: a device body 101; a paper feed tray 102 where paper, which is put into the device body 101, is loaded; a paper discharge tray 103 that is stocked with paper which is put into the device body 101 and on which an image is recorded (formed); and an ink cartridge mounting portion 104 which is provided on one end portion-side of a front surface 112 of the device body 101 in such a way as to protrude in a forward direction from the front surface 112, and is positioned below an upper cover 111. On an upper surface of the ink cartridge mounting portion 104, an operation portion 105, which includes operation keys and indicators, is disposed. The ink cartridge mounting portion 104 includes a front cover 115, which can be opened and closed to allow the ink cartridge 200 to be removed therefrom and attached thereto.

Figure 5:
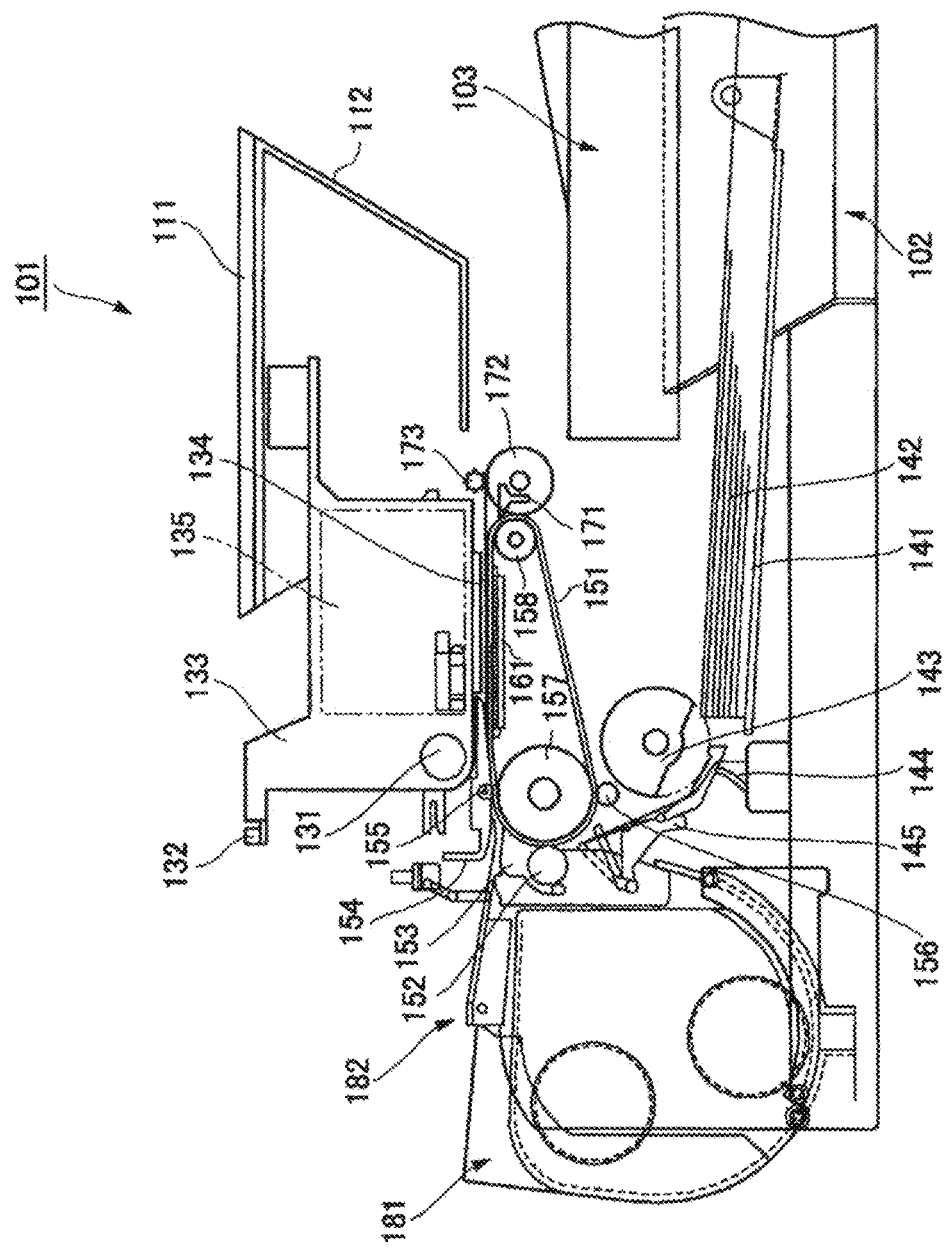
FIG. 5 is a partially enlarged cross-sectional view of one example of an inkjet recording device of the present invention.
Figure 6:
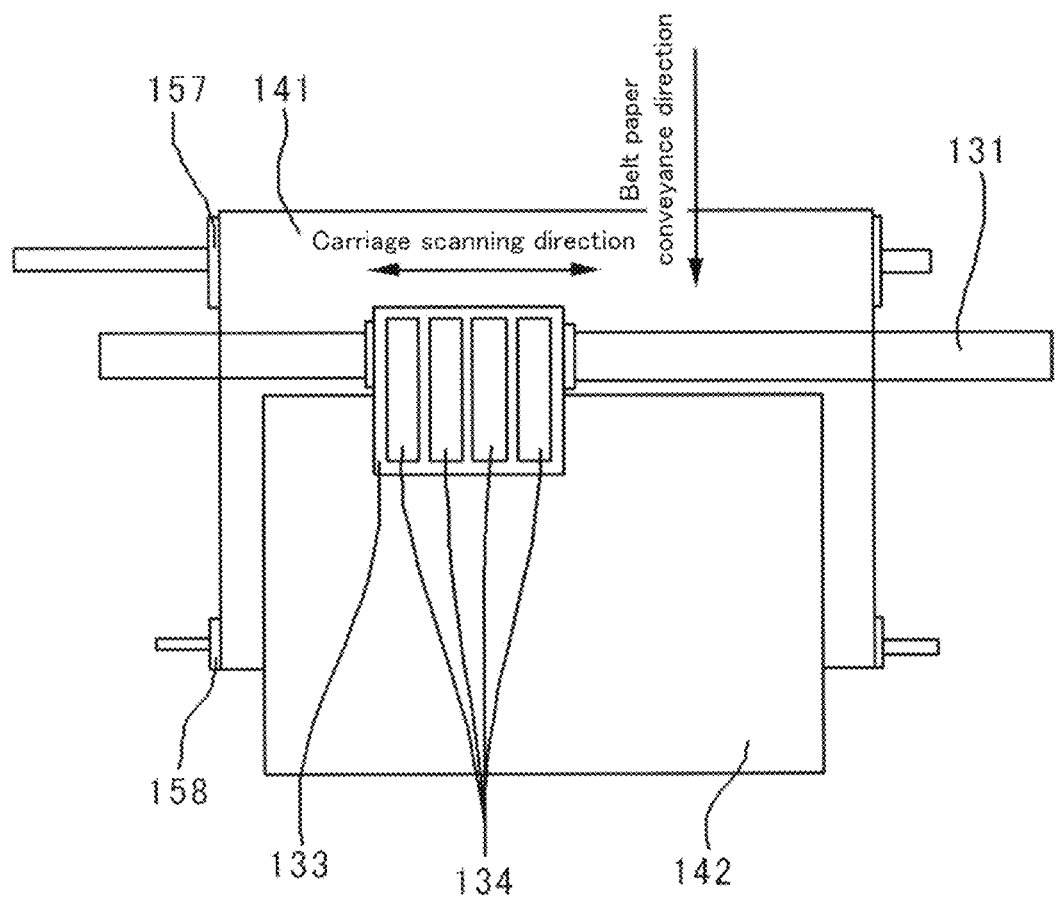
FIG. 6 is a partially enlarged cross-sectional view of one example of an inkjet recording device of the present invention.

As shown in FIGS. 5 and 6 (which are partially enlarged cross-sectional views of the inkjet recording device shown in FIG. 4), in the device body 101, a carriage 133 is held by a guide rod 131 and a stay 132 in such a way that the carriage 133 can freely slide in a main scanning direction: the guide rod 131 is a guide member, which is horizontally suspended between left and right side plates, which are not shown in the drawings. The carriage 133 is moved by a main scanning motor (not shown) for scanning in a direction indicated by arrow as shown in FIG. 6.

In the carriage 133, recording heads 134, which are four inkjet recording heads that jet drops of ink of each of colors Yellow (Y), cyan (C), magenta (M), and black (Bk), are arranged in a direction in which a plurality of ink jetting openings cross the main scanning direction. The recording heads 134 are so mounted that the ink-drop jetting direction runs in the downward direction.

As for the inkjet recording heads that make up the recording heads 134, the following are available: those including, as an energy generation unit configured to jet the ink, a piezoelectric actuator, such as a piezoelectric element, a thermal actuator, which uses an electrothermal conversion element such as a heating resistor to make use of a change of phase resulting from film boiling of a liquid, a shape memory alloy actuator, which uses a change of metal phase resulting from a change in temperature, an electrostatic actuator, which uses an electrostatic force, and the like. In the carriage 133, a subtank 135 of each color is mounted to supply the ink of each color to the recording heads 134. To the subtanks 135, via an ink supply tube (not shown), from the ink cartridge 200 of the present invention that is mounted on the ink cartridge mounting portion 104, the ink is supplied. In this manner, the subtanks 135 are filled up with the ink.

As a paper feed unit that feeds sheets of paper 142 that are stacked on a paper sheet stacking unit (platen) 141 of a paper feed tray 103, a half-moon roller (paper feed roller 143) and a separation pad 144 are provided: the half-moon roller is designed to separate and feed one paper sheet 142 after another from the paper sheet stacking unit 141; and the separation pad 144 faces the paper feed roller 143, and is made from a material with a large friction coefficient. The separation pad 144 is pressed toward the paper feed roller 143.

As a conveying unit that conveys a paper sheet 142 fed from the paper feed unit below the recording heads 134, the following are provided: a conveying belt 151, which is designed to convey the paper sheet 142 with the help of electrostatic adsorption; a counter roller 152, which is designed to convey the paper sheet 142 supplied via a guide 145 from the paper feed unit in such a way that the paper sheet 142 is held between the conveying belt 151 and the counter roller 152; a conveying guide 153, which is designed to change the direction of the paper sheet 142 that is substantially vertically sent in an upward direction by almost 90° so that the paper sheet 142 then travels on and along the conveying belt 151; and a tip pressure roller 155, which is pressed by a pressing member 154 toward the conveying belt 151.

A charging roller 156 is provided as a charging unit configured to charge a surface of the conveying belt 151. The conveying belt 151 is an endless belt, and is extended around a conveying roller 157 and a tension roller 158, and is able to rotate in a belt conveying direction. For example, the conveying belt 151 includes an outer layer, which is made from a resin material with a thickness of about 40 μm that has not been resistance-controlled, such as a copolymer of tetrafluoroethylene and ethylene (ETFE), and which serves as a paper adsorption surface; and a back layer (middle resistance layer, earth layer), which is made from the same material as the outer layer and which has been resistance-controlled with carbon. On the back side of the conveying belt 151, a guide member 161 is so disposed as to correspond to a printing/copying area of the recording heads 134.

Incidentally, as a paper discharge unit that discharges the paper sheet 142 on which recording is performed by the recording heads 134, the following are provided: a separation claw 171, which is designed to separate the paper sheet 142 from the conveying belt 151; a paper discharge roller 172; and a paper discharge roller 173. Below the paper discharge roller 172, the paper discharge tray 103 is placed.

On a back surface portion of the device body 101, a two-side paper feed unit 181 is mounted in such a way that the two-side paper feed unit 181 can be freely attached thereto and removed therefrom.

The two-side paper feed unit 181 is designed to take the paper sheet 142 that is returned by reverse-direction rotation of the conveying belt 151 to flip the paper sheet 142, and then feed the paper sheet 142 again into between the counter roller 152 and the conveying belt 151. Incidentally, on an upper surface of the two-side paper feed unit 181, a manual paper feed unit 182 is provided.

In the inkjet recording device, the paper feed unit separately feeds one paper sheet 142 after another. The paper sheet 142 that is substantially vertically fed in an upward direction is guided by the guide 145, and is conveyed between the conveying belt 151 and the counter roller 152. Furthermore, the tip thereof is guided by the conveying guide 153, and the paper is pressed by the tip pressure roller 155 against the conveying belt 151, and the conveying direction is changed by almost 90°. At this time, the conveying belt 151 is charged by the charging roller 156. The paper sheet 142 is conveyed by the conveying belt 151 with the help of electrostatic adsorption. Then, the carriage 133 is moved, and the recording heads 134 are driven in accordance with an image signal. Ink droplets are then jetted to the stopped paper sheet 142 to record one line. After the paper sheet 142 is conveyed a predetermined distance, the next line is recorded.

After the inkjet recording device receives a recording end signal or a signal indicating that the rear end of the paper sheet 142 has reached a recording area, the recording operation is stopped. The paper sheet 142 is then discharged to the paper discharge tray 103. When a near-end state of the remaining ink in the subtanks 135 is detected, a predetermined amount of ink is supplied to the subtanks 135 from the ink cartridge 200.

In the case of the inkjet recording device, when the ink cartridge 201 of the present invention runs out of the ink, the housing of the ink cartridge 200 can be torn down to allow replacement of only internal ink bags. If the ink cartridge 200 is placed vertically and mounted onto a front surface, the supply of the ink remains stable. Accordingly, for example, even if the device body 101 is placed in such a way that the upper side thereof is blocked, or even if the device body 101 is housed in a rack, or even if an object is placed on the upper surface of the device body 101, the ink cartridge 200 can be easily replaced.

Incidentally, the above has described an example in which the present invention is applied to a serial-type (shuttle-type) inkjet recording device in which the carriage scans. The present invention may be similarly applied to a line-type inkjet recording device with a line-type head.

The inkjet recording device of the present invention can be applied to various types of recording associated with an inkjet recording method. For example, in particular, the present invention can be preferably applied to an inkjet recording printer, a fax machine, a copying machine, a printer/fax/copier combined machine, and the like.

(Ink Recorded Matter)

An ink recorded matter on which recording is carried out by the inkjet recording method of the present invention is an ink recorded matter of the present invention. That is, the ink recorded matter of the present invention has, on a recording medium (recording media), an image that is recorded with the inkjet recording ink of the present invention.

The recording media are not particularly limited and may be appropriately selected depending on the intended purpose. Examples thereof include plain paper, coated paper for printing, glossy paper, special paper, cloth, film, and OHP sheet. One of the above materials may be used independently, or two or more of the above materials may be used in combination. Among the above materials, the plain paper and the coated paper for printing are preferred. The plain paper is inexpensive, and is therefore favorable. The coated paper for printing is favorable because the coated paper for printing is relatively less expensive than the glossy paper and can provide a glossy smooth image. However, the plain paper and the coated paper for printing are poor in drying characteristics, and, in general, it was difficult for the plain paper and the coated paper for printing to be used for inkjet. However, the ink of the present invention makes it possible to use the plain paper and the coated paper for printing because of an improvement in drying characteristics.

The ink recorded matter of the present invention can provide a high-quality unblurred image, and is excellent in stability over time, and can be suitably used in various applications, such as materials on which various characters or images are recorded.

EXAMPLES

Hereinafter, the present invention will be described in more detail through examples. However, the present invention is not limited to the examples.

<Example of Preparing Pigment Dispersion>

Preparation Example 1

Black Pigment Dispersion Liquid (Black Dispersion)

According to the following formulation (1), a mixture of the following carbon black pigment, dispersing agent, and pure water was pre-mixed. After that, with the use of a disc-type bead mill (KDL-type, manufactured by SHINMARU ENTERPRISES CORPORATION, Media: Zirconia balls with a diameter of 0.1 mm were used), circulation dispersion took place for 10 min at a circumferential speed of 10 m/s, and a black pigment dispersion liquid was obtained.
Formulation (1)
  Carbon black pigment: (product name: NIPEX150, manufactured by Orion Engineered Carbons Co., Ltd.) . . . 15% by mass
  Dispersing agent (sodium naphthalene sulfonate-formalin condensate, A-45-PN, manufactured by Takemoto Oil & Fat Co., Ltd.) . . . 3% by mass
  Pure water . . . 82% by mass Preparation Example 2

Cyan Pigment Dispersion Liquid (Cyan Dispersion)

A cyan pigment dispersion liquid was obtained in a similar way to that in Preparation Example 1 except that the carbon black pigment in Preparation Example 1 was replaced with Pigment Blue 15:3.

Preparation Example 3

Magenta Pigment Dispersion Liquid (Magenta Dispersion)

A magenta pigment dispersion liquid was obtained in a similar way to that in Preparation Example 1 except that the carbon black pigment in Preparation Example 1 was replaced with Pigment Red 122.

Preparation Example 4

Yellow Pigment Dispersion Liquid (Yellow Dispersion)

A yellow pigment dispersion liquid was obtained in a similar way to that in Preparation Example 1 except that the carbon black pigment in Preparation Example 1 was replaced with Pigment Yellow 74.
<Synthesis Example of pH-Responsive Polymer Micropar­ticle>

Synthesis examples of polymer microparticles used in the ink of the present invention are shown. Incidentally, in synthesis examples, the mass average molecular weight of a polymer was measured by the method described below.

With the use of a column constant temperature tank (CTO-20A, manufactured by Shimadzu Corporation), a detector (RID-10A, manufactured by Shimadzu Corporation), an eluent flow-path pump (LC-20AD, manufactured by Shimadzu Corporation), a degasser (DGU-20A, manufactured by Shimadzu Corporation), and an auto sampler (SIL-20A, manufactured by Shimadzu Corporation), the mass average molecular weight was measured by GPC method. As for the column, the following were used after being connected: Aqueous SEC column TSKgelG3000PWXL, manufactured by Tosoh Corporation (Elimination limit molecule quantity: $2 \times 10^5$); TSKgelG5000PWXL (Elimination limit molecule quantity: $2.5 \times 10^6$); and TSKgelG6000PWXL (Elimination limit molecule quantity: $5 \times 10^7$). A sample was prepared with a concentration of 2 g/100 mL with the use of an eluent, and was used for the measurement. As for the eluent, an aqueous solution was prepared in the following manner before being used: 0.5 mol/L of acetic acid, and 0.5 mol/L of sodium acetate. The column temperature was 40° C., and the flow rate was 1.0 mL per minute. As standard samples, the following were used: nine types of polyethylene glycol, with a molecular weight of 1,065, 5,050, 24,000, 50,000, 107,000, 140,000, 250,000, 540,000, and 920,000. Calibration curves were obtained. Based on the calibration curve, the mass average molecular weight of a polymer was calculated.

The particle diameter of a pH-responsive polymer microparticle of the present invention was measured by a dynamic light scattering method (Zetasizer Nano ZS, manufactured by Malvern). The particle diameter means the volume average particle diameter (D50).

As for the pH at a time when the particle diameter of a pH-responsive polymer microparticle of the present invention was measured, a 0.2% dispersion liquid was prepared with hydrochloric acid or sodium hydroxide.

[1] Synthesis of Hydrophilic Macromonomer [General Formula (3)]

[1] Synthesis of Methacryloyloxyethyl Trimethyl Ammonium Chloride Polymer

In a reaction vessel equipped with a stirring device, a reflux condenser, two dropping funnels, a nitrogen gas inlet tube, and a thermometer, 463.5 g of water was put. The water was heated, and the temperature was raised to 80° C. Under a nitrogen stream, the following were simultaneously dropped over two hours: a mixed solution of 500 g (1.93 mol) of an 80% by mass aqueous solution of methacryloyloxyethyl trimethyl ammonium chloride, and 20.3 g (0.22 mol) of mercaptoacetic acid, and 16.2 g (0.003 mol) of a 5% by mass aqueous solution of potassium persulfate.

After the dropping, the temperature was kept at 80° C. for three hours. As a result, the following was obtained: a polymer solution of methacryloyloxyethyl trimethyl ammonium chloride having a carboxyl group at a terminal (solid content concentration: 42.1% by mass). After the reaction, reprecipitation was carried out several times with the use of acetone, and the polymer of methacryloyloxyethyl trimethyl ammonium chloride was purified. The mass average molecular weight of the obtained polymer, which was calculated by GPC (liquid chromatography), was 12,000, and the number average molecular weight was 6,000.

[2] Introduction of Radically Polymerizable Group into Terminal of Methacryloyloxyethyl Trimethyl Ammonium Chloride Polymer Then, in a reaction vessel equipped with a stirring device, a reflux condenser, and a thermometer, the following was put: 700.0 g of the polymer solution of methacryloyloxyethyl trimethyl ammonium chloride (solid content concentration: 42.8% by mass) [With mercaptoacetic acid as a unit, 0.15 mol (determined based on the previous preparation)]. Then, 280.0 g of ethanol was added. The following were also added: 16.7 g (0.20 mol) of a 48% by mass aqueous solution of sodium hydroxide, 13.0 g (0.04 mol) of tetrabutylammonium bromide, and 30.2 g (0.20 mol) of p-chloromethyl styrene. The reaction took place for 72 hours at 30° C. As a result, the following was obtained: a polymer solution of methacryloyloxyethyl trimethyl ammonium chloride containing a terminal vinylbenzyl group (solid content concentration: 32.8% by mass). After the reaction, re-precipitation was carried out with the use of acetone, and the following was purified: the polymer of methacryloyloxyethyl trimethyl ammonium chloride containing a terminal vinylbenzyl group (or the hydrophilic macromonomer represented by the general formula (3)).

According to the results of $^1$H-NMR measurement, it was found that the rate of the introduction of vinylbenzyl group into the terminal was almost 100%. The number average molecular weight of the polymer of methacryloyloxyethyl trimethyl ammonium chloride containing a terminal vinylbenzyl group, which was measured by GPC (liquid chromatography), was 6,100.

Sections [2] and [3] below show synthesis examples of pH-responsive polymer microparticles. Section [2] shows a synthesis example of polymer microparticles, in which the monomer represented by the structural formula (1) was used. Section [3] shows a synthesis example of polymer microparticles, in which the monomer represented by the general formula (2) was used.

[2] Synthesis Examples and Comparative Synthesis Examples of pH-Responsive Polymer Microparticles (when the Monomer Represented by the Structural Formula (1) was Used)

Synthesis Example 1

Synthesis of pH-Responsive Polymer Microparticle A

—Synthesis of Polymer Microparticle, with Polymer Chains of Methacryloyloxyethyl Trimethyl Ammonium Chloride Localized on a Surface Thereof—

In a reaction vessel equipped with a stirring device, a reflux condenser, a nitrogen gas inlet tube, and a thermometer, the following were put: 247.6 g of the polymer solution of methacryloyloxyethyl trimethyl ammonium chloride containing a terminal vinylbenzyl group [As a repeating unit of methacryloyloxyethyl trimethyl ammonium chloride, 0.32 mol (determined based on the previous preparation)], 100.4 g (0.64 mol) of dimethylaminoethyl methacrylate, 33.3 g (0.32 mol) of styrene, and 537.6 g of water. After the pH was adjusted with hydrochloric acid, the temperature was raised to 60° C. Under a nitrogen stream, 81.1 g (0.015 mol) of a 5% by mass aqueous solution of potassium persulfate was added, and copolymerization took place for six hours. As a result, the following was obtained: a milky-white dispersion liquid of pH-responsive polymer microparticle A (solid content concentration: 22.9% by mass).

Synthesis Example 2

Synthesis of pH-Responsive Polymer Microparticle B

As for the synthesis of pH-responsive polymer microparticle A in Synthesis Example 1, the reaction took place in a similar way to that in Synthesis Example 1 except: 227.2 g of the polymer solution of methacryloyloxyethyl trimethyl ammonium chloride containing a terminal vinylbenzyl group [As a repeating unit of methacryloyloxyethyl trimethyl ammonium chloride, 0.29 mol (determined based on the previous preparation)], 108.6 g (0.58 mol) of dimethylaminoethyl methacrylate, 30.5 g (0.29 mol) of styrene, and 552.6 g of water. As a result, the following was obtained: a milky-white dispersion liquid of pH-responsive polymer microparticle B (solid content concentration: 23.0% by mass).

Comparative Synthesis Example 1

As for the synthesis of polymer microparticle A in Synthesis Example 1, the reaction took place in a similar way to that in Synthesis Example 1 except: 532.0 g of the polymer solution of methacryloyloxyethyl trimethyl ammonium chloride containing a terminal vinylbenzyl group [As a repeating unit of methacryloyloxyethyl trimethyl ammonium chloride, 0.70 mol (determined based on the previous preparation)], 67.9 g (0.65 mol) of styrene, and 319.0 g of water. As a result, the following was obtained: a milky-white dispersion liquid of polymer microparticle (solid content concentration: 23.8% by mass).

Comparative Synthesis Example 2

A gel microparticle (or a gel microparticle made by cross-linking dimethylamino methacrylate with N,N-methylenebisacrylamide), disclosed in Example 1 of JP-B No. 3155318, was synthesized and used. At pH 5, the average particle diameter of the synthesized gel microparticle (pH-responsive polymer microparticle) was 380 nm.

Figure 7:
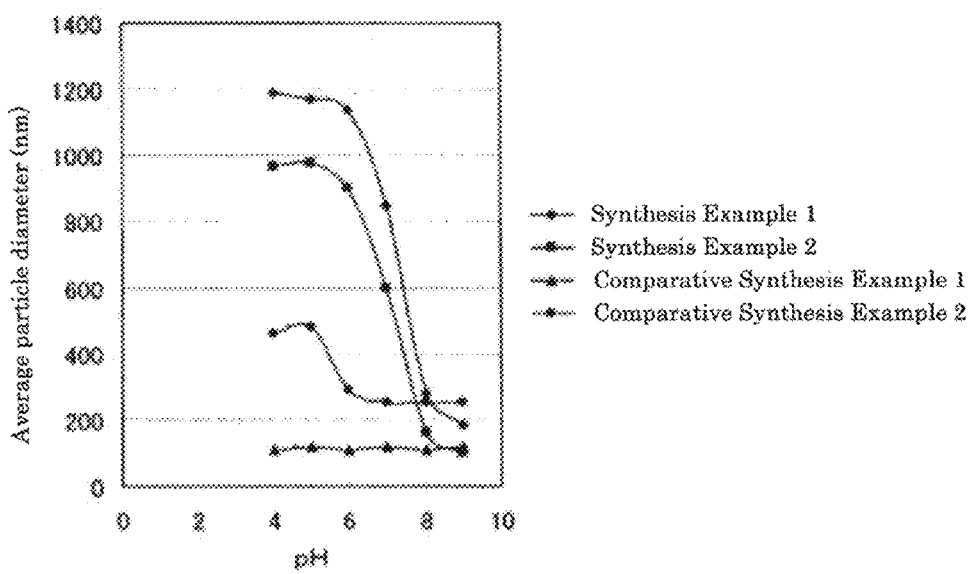
FIG. 7 is a diagram showing relation between pH and average particle diameter of polymer microparticles in Synthesis Examples 1 and 2, and Comparative Synthesis Examples 1 and 2, in which a monomer represented by the structural formula (1) is used.

FIG. 7 shows the relation between pH and average particle diameter of polymer microparticles in Synthesis Examples 1 and 2 and Comparative Synthesis Examples 1 and 2, which were obtained as described above.

According to the results shown in FIG. 7, the average particle diameters of the pH-responsive polymer microparticles in Synthesis Examples 1 and 2 and Comparative Synthesis Example 2 were 100 nm to 300 nm when the pH was 8.5 or higher. As the pH became lower, the average particle diameters became significantly larger.

In the case of a conventional technique, or in the case of the pH-responsive polymer microparticle of Comparative Synthesis Example 2 for example, the particle diameter was small when the pH was high. As the pH became lower, the average particle diameter became gradually larger. However, the change in the average particle diameter was smaller than that of the pH-responsive polymer microparticle of the present invention. That is, in the case of the pH-responsive polymer microparticle of the present invention, as the pH became lower, the average particle diameter started to become larger even at a relatively high level of pH. It is clear that, at the time of saturation, a change in the average particle diameter was large. Meanwhile, in the case of the polymer microparticle of Comparative Synthesis Example 1 that did not have the pH-sensitive monomer represented by the general formula (3) that was an essential component of the present invention, it is clear that the average particle diameter remained unchanged even as the pH was changed.

Examples 1 to 12, Comparative Examples 1 to 10

Production of Inkjet Recording Ink

As for the configuration of the ink composition in Examples and Comparative Examples in which the monomer represented by the formula (1) was used, Tables 1 and 2 below show the configuration of the ink composition in Examples 1 to 12, and Tables 3 and 4 below show the configuration of the ink composition in Comparative Examples 1 to 10. Incidentally, the values in the tables are expressed in % by mass.

With the use of pigment dispersions in Preparation Examples and polymer microparticles in Synthesis Examples, the inks were prepared. The inks were stirred for one and a half hours, and were filtered with a membrane filter with a pore diameter of 1.2 μm. In this manner, each ink was obtained.

Incidentally, abbreviations and the like in Tables 1 to 4 mean:

Acrylic silicone resin emulsion: Manufactured by Showa High Polymer Co., Ltd, POLYZOL ROY6312, Solid content: 37.2% by mass, Average particle diameter: 171 nm, Minimum film forming temperature (MFT): 20° C.

Polyurethane emulsion: Manufactured by DIC Corporation, HYDRAN APX-101H, Solid content: 45% by mass, Average particle diameter: 160 nm, Minimum film forming temperature (MFT): 20° C.

KF-643: Polyether-modified silicone compound (manufactured by Shin-Etsu Chemical Co., Ltd., Component: 100% by mass)

Proxel GXL: Fungicide made up mainly of 1,2-benzisothiazolin-3-one (manufactured by Avecia Ltd., Component: 20% by mass, containing dipropylene glycol).

TABLE 1

| | Ink composition | Ex. 1 | Ex. 2 | Ex. 3 | Ex. 4 | Ex. 5 | Ex. 6 |
|---|---|---|---|---|---|---|---|
| Pigment dispersion | Black dispersion (as solid content) | 8 | — | — | — | 8 | — |
| | Magenta dispersion (as solid content) | — | 6 | — | — | — | 6 |
| | Cyan dispersion (as solid content) | — | — | 6 | — | — | — |
| | Yellow dispersion (as solid content) | — | — | — | 6 | — | — |
| pH-responsive polymer microparticles | Synthesis Example 1 | 0.1 | 0.1 | 0.1 | 0.1 | — | — |
| | Synthesis Example 2 | — | — | — | — | 0.2 | 0.4 |
| Water-dispersible resin | Acrylic silicone resin emulsion | 3 | 3 | 3 | 3 | — | — |
| | Polyurethane emulsion | — | — | — | — | 2.5 | 2.5 |
| Wetting agent | 1,3-butanediol | 15 | 20 | 20 | 20 | 15 | 20 |
| | glycerin | 15 | 10 | 10 | 10 | 15 | 10 |
| Penetrating agent | 2-ethyl-1,3-hexanediol | 1.0 | 2.0 | 2.0 | 2.0 | 2.0 | 2.0 |
| | 2,2,4-trimethyl-1,3-pentanediol | 1.0 | — | — | — | — | — |
| Surfactant | KF-643 | 1.00 | 1.00 | 1.00 | 1.00 | 1.00 | 1.00 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | Balance | Balance | Balance | Balance | Balance | Balance |
| Total (%) | | 100 | 100 | 100 | 100 | 100 | 100 |

TABLE 2

| | Ink composition | Ex. 7 | Ex. 8 | Ex. 9 | Ex. 10 | Ex. 11 | Ex. 12 |
|---|---|---|---|---|---|---|---|
| Pigment dispersion | Black dispersion (as solid content) | — | — | 8 | — | — | 8 |
| | Magenta dispersion (as solid content) | — | — | — | — | — | — |
| | Cyan dispersion (as solid content) | 6 | — | — | 6 | 6 | — |
| | Yellow dispersion (as solid content) | — | 6 | — | — | — | — |
| pH-responsive polymer microparticles | Synthesis Example 1 | — | — | 0.05 | — | — | 0.03 |
| | Synthesis Example 2 | 0.4 | 0.4 | — | 2.0 | 2.5 | — |
| Water-dispersible resin | Acrylic silicone resin emulsion | — | — | — | — | — | — |
| | Polyurethane emulsion | 2.5 | 2.5 | 2.5 | 2.5 | 2.5 | 2.5 |
| Wetting agent | 1,3-butanediol | 20 | 20 | 20 | 20 | 20 | 20 |
| | glycerin | 10 | 10 | 10 | 10 | 10 | 10 |
| Penetrating agent | 2-ethyl-1,3-hexanediol | 1.0 | 2.0 | — | — | 2.0 | — |
| | 2,2,4-trimethyl-1,3-pentanediol | 1.0 | — | 2.0 | 2.0 | — | 2.0 |
| Surfactant | KF-643 | 1.00 | 1.00 | 1.00 | 1.00 | 1.00 | 1.00 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | Balance | Balance | Balance | Balance | Balance | Balance |
| Total (%) | | 100 | 100 | 100 | 100 | 100 | 100 |

TABLE 3

| | Ink composition | Comp. Ex. 1 | Comp. Ex. 2 | Comp. Ex. 3 | Comp. Ex. 4 |
|---|---|---|---|---|---|
| Pigment dispersion | Black dispersion (as solid content) | 8 | — | — | — |
| | Magenta dispersion (as solid content) | — | 6 | — | — |
| | Cyan dispersion (as solid content) | — | — | 6 | — |
| | Yellow dispersion (as solid content) | — | — | — | 6 |
| Polymer microparticles | Comparative synthesis example 1 | 0.5 | 2.0 | 0.5 | 2.0 |
| | Comparative synthesis example 2 | — | — | — | — |
| Water-dispersible resin | Acrylic silicone resin emulsion | 3 | 3 | 3 | 3 |
| | Polyurethane emulsion | — | — | — | — |
| Wetting agent | 1,3-butanediol | 15 | 20 | 20 | 20 |
| | glycerin | 20 | 15 | 15 | 15 |
| Penetrating agent | 2-ethyl-1,3-hexanediol | 1.0 | 2.0 | 2.0 | 2.0 |
| | 2,2,4-trimethyl-1,3-pentanediol | 1.0 | — | — | — |
| Surfactant | KF-643 | 1.00 | 1.00 | 1.00 | 1.00 |
| Fungicide | PROXEL GXL | 0.05 | 0.05 | 0.05 | 0.05 |
| pH adjuster | 2-amino-2-ethyl-1,3-propanediol | 0.3 | 0.3 | 0.3 | 0.3 |
| Water | Pure water | Balance | Balance | Balance | Balance |
| Total (%) | | 100 | 100 | 100 | 100 |

TABLE 4

| | Ink composition | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Pigment dispersion | Black dispersion (as solid content) | 8 | — | — | — | 8 | — |
| | Magenta dispersion (as solid content) | — | 6 | — | — | — | — |
| | Cyan dispersion (as solid content) | — | — | 6 | — | — | — |
| | Yellow dispersion (as solid content) | — | — | — | 6 | — | 6 |
| Polymer microparticles | Comparative synthesis example 1 | — | — | — | — | — | — |
| | Comparative synthesis example 2 | 0.4 | 0.4 | 0.4 | 2.0 | — | — |
| Water-dispersible resin | Acrylic silicone resin emulsion | — | — | — | — | 3.0 | — |
| | Polyurethane emulsion | 2.5 | 2.5 | 2.5 | 2.5 | — | 2.5 |
| Wetting agent | 1,3-butanediol | 15 | 20 | 20 | 20 | 20 | 20 |
| | glycerin | 15 | 10 | 10 | 10 | 10 | 10 |
| Penetrating agent | 2-ethyl-1,3-hexanediol | 2.0 | 2.0 | 2.0 | 2.0 | — | — |
| | 2,2,4-trimethyl-1,3-pentanediol | — | — | — | — | 2.0 | 2.0 |
| Surfactant | KF-643 | 1.00 | 1.00 | 1.00 | 1.00 | 1.00 | 1.00 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | Balance | Balance | Balance | Balance | Balance | Balance |
| Total (%) | | 100 | 100 | 100 | 100 | 100 | 100 |

Then, by an evaluation method described later, the inkjet recording inks of Examples 1 to 12 and Comparative Examples 1 to 10 were evaluated. Table 5 below shows the results.

Incidentally, the key points of Examples 1 to 12 and Comparative Examples 1 to 10 are shown below:

Examples 1 to 4 were the case where the number of carbon atoms of an alkyl group (R) of a pH-sensitive monomer represented by the general formula (3) was 1;

Examples 5 to 8 were the case where the number of carbon atoms of an alkyl group (R) of a pH-sensitive monomer represented by the general formula (3) was 2;

Examples 9 to 12 were the case where the amount of the pH-responsive polymer microparticle of the present invention contained was changed;

Comparative Examples 1 to 4 were the case where the polymer microparticle of Comparative Synthesis Example 1 (that did not have the pH-sensitive monomer represented by the general formula (3)) was used;

Comparative Examples 5 to 8 were the case where the pH-responsive polymer microparticle disclosed in Japanese Patent No. 3155318 was used (Comparative Synthesis Example 2); and Comparative Examples 9 and 10 were the case where no polymer microparticle was contained.

<Image Density Evaluation>

Under a 23° C., 50% RH environment, an inkjet printer (IPSIO GX5000, manufactured by Ricoh Co., Ltd.) was filled with the produced inks. A chart that had 64-point character "■," which was created by Microsoft Word2000 (manufactured by Microsoft), was printed on MYPAPER (manufactured by NBS Ricoh Co., Ltd.). The color of the portion "■" on the printed surface was measured by X-RITE938 (manufactured by X-Rite, Inc.), and was assessed based on the following evaluation criteria.

As for the print mode, the mode "Plain paper-Standard fast" was modified by an accompanying printer driver in user settings of plain paper so as to have "no color correction." The modified mode was used.

[Evaluation Criteria]
A: Black: 1.2 or higher, Magenta: 0.95 or higher
 Cyan: 0.95 or higher, Yellow: 0.8 or higher
B: Black: 1.1 or higher, Magenta: 0.9 or higher
 Cyan: 0.9 or higher, Yellow: 0.7 or higher
C: Black: less than 1.1, Magenta: less than 0.9
 Cyan: less than 0.9, Yellow: less than 0.7

<Evaluation of Ink Storage Stability>

Each of the inks was charged into an ink cartridge and stored at 60° C. for 2 weeks, to thereby evaluate a change of its viscosity after the storage from its viscosity before the storage according to the following evaluation criteria.

[Evaluation Criteria]
A: Change in viscosity was within ±10%
B: Change in viscosity was within ±30%
C: Change in viscosity exceeded 30%

<Evaluation of Ink Jetting Stability>

Under a 28° C., 15% RH environment, an inkjet printer (IPSIO GX5000, manufactured by Ricoh Co., Ltd.) was filled with the produced inks. Five sets of paper sheets (200 sheets per set), which were MyPaper (manufactured by NBS Ricoh Co., Ltd.), were sequentially printed at a resolution of 600 dpi. At this time, jetting-disturbance events and non-jetting events were assessed based on the following criteria. Incidentally, as for a print pattern, in an entire area of a paper surface created by Microsoft Word 2000 (manufactured by Microsoft), in a chart in which the print area of each color was 5%, printing was performed with each ink at 100% duty. The print conditions were as follows: the recording density was 300 dpi, with one-pass printing.

[Evaluation Criteria]
A: No jetting-disturbance events, and no non-jetting events
B: Few non-jetting events, and few jetting-disturbance events
C: Severe non-jetting events, and severe jetting-disturbance events <Evaluation of Tendency of Fixation to Nozzle>

An inkjet printer (IPSIO GX5000, manufactured by Ricoh Co., Ltd.) was put into a constant-temperature-and-humidity chamber. The environment of the chamber was set in the following manner: Temperature 32° C., 30% RH. A print pattern chart described below was sequentially printed on 20 paper sheets. The inkjet printer then remained in a resting state for 20 min during which printing was not performed. The above operation was repeated 50 times, and 1,000 paper sheets were printed in total. Then, the nozzle plate was observed under a microscope to make a determination as to whether or not the fixation of the ink had occurred. Incidentally, as for a print pattern, in an entire area of a paper surface created by Microsoft Word 2000 (manufactured by Microsoft), in a chart in which the print area of each color was 5%, printing was performed with each ink at 100% duty. The print conditions were as follows: the recording density was 300 dpi, with one-pass printing.

[Evaluation Criteria]
A: No fixation had occurred around the nozzle
B: Fixation had occurred around the nozzle
C: Severe fixation had occurred across the entire surface of the nozzle plate

TABLE 5

| Examples | Image density | Ink storage stability | Ink jetting stability | Tendency of fixation to nozzle |
|---|---|---|---|---|
| Example 1 | A | A | A | A |
| Example 2 | A | A | A | A |
| Example 3 | A | A | A | A |
| Example 4 | A | A | A | A |
| Example 5 | A | A | A | A |
| Example 6 | A | A | A | A |
| Example 7 | A | A | A | A |
| Example 8 | A | A | A | A |
| Example 9 | A | A | A | A |
| Example 10 | A | A | A | A |
| Example 11 | A | A | B | A |
| Example 12 | B | A | A | A |
| Comp. Example 1 | C | A | A | A |
| Comp. Example 2 | C | C | B | B |
| Comp. Example 3 | C | A | A | A |
| Comp. Example 4 | C | B | B | C |
| Comp. Example 5 | C | A | A | A |
| Comp. Example 6 | C | B | A | A |
| Comp. Example 7 | C | A | A | A |
| Comp. Example 8 | B | C | C | C |
| Comp. Example 9 | C | A | A | A |
| Comp. Example 10 | C | A | A | A |

According to the evaluation results, the ink of the present invention, which contains, as an element of the ink composition, a pH-responsive polymer microparticle that is a copolymer of the hydrophobic monomer represented by the structural formula (1), the pH-sensitive monomer represented by the general formula (3), and the hydrophilic macromonomer represented by the general formula (4), is excellent in image density, ink storage stability, ink jetting stability, and tendency of fixation to nozzle. Characteristics that could be problematic in practical use are not confirmed.

For example, when a comparison is made between Examples 1 to 4 and 5 to 8 and Comparative Examples 1 to 4, 5 to 8, and 9 and 10, it is clear that each of the color inks of the present invention is definitely excellent in image density due to the effects of the pH-responsive polymer microparticle;

and that the color inks have the same levels, or higher levels, of ink storage stability, ink jetting stability, and tendency of fixation to nozzle.

From the results of Example 9 (lower limit) and Example 10 (upper limit), it is clear that, even if the amount of the pH-responsive polymer microparticle is an upper or lower limit of a preferred range, the same advantageous effects as those in Examples 1 to 8 can be obtained.

If the amount of the pH-responsive polymer microparticle is greater than the preferred range, the image density deteriorates as in the case of Example 11 (less than the lower limit), or the ink jetting stability slightly deteriorates as in the case of Example 12 (greater than the upper limit).

[3] Synthesis Examples and Comparative Synthesis Examples of pH-Responsive Polymer Microparticles (when the Monomer Represented by The General Formula (2) was Used)

Synthesis Example A1

Synthesis of pH-Responsive Polymer Microparticle a

In a reaction vessel equipped with a stirring device, a reflux condenser, a nitrogen gas inlet tube, and a thermometer, the following were put: 330.6 g of the polymer solution of methacryloyloxyethyl trimethyl ammonium chloride containing a terminal vinylbenzyl group [As a repeating unit of methacryloyloxyethyl trimethyl ammonium chloride polymer, 0.43 mol (determined based on the previous preparation)], 67.0 g (0.43 mol) of dimethylaminoethyl methacrylate, 43.1 g (0.43 mol) of ethyl acrylate, and 478.2 g of water. After the pH was adjusted with hydrochloric acid, the temperature was raised to 60° C. Under a nitrogen stream, 81.1 g (0.015 mol) of a 5% by mass aqueous solution of potassium persulfate was added, and copolymerization took place for six hours. As a result, the following was obtained: a milky-white dispersion liquid of pH-responsive polymer microparticle a (solid content concentration: 23.2% by mass).

Synthesis Example A2

Synthesis of pH-Responsive Polymer Microparticle b

In a reaction vessel equipped with a stirring device, a reflux condenser, a nitrogen gas inlet tube, and a thermometer, the following were put: 247.6 g of the polymer solution of methacryloyloxyethyl trimethyl ammonium chloride containing a terminal vinylbenzyl group [As a repeating unit of methacryloyloxyethyl trimethyl ammonium chloride, 0.32 mol (determined based on the previous preparation)], 100.4 g (0.64 mol) of dimethylaminoethyl methacrylate, 32.1 g (0.32 mol) of ethyl acrylate, and 538.8 g of water. After the pH was adjusted with hydrochloric acid, the temperature was raised to 60° C. Under a nitrogen stream, 81.1 g (0.015 mol) of a 5% by mass aqueous solution of potassium persulfate was added, and copolymerization took place for six hours. As a result, the following was obtained: a milky-white dispersion liquid of pH-responsive polymer microparticle b (solid content concentration: 22.8% by mass).

Synthesis Example A3

Synthesis of pH-Responsive Polymer Microparticle c

As for the synthesis of pH-responsive polymer microparticle b in Synthesis Example A2, the reaction took place in a similar way to that in Synthesis Example A2 except that: 32.1 g (0.32 mol) of ethyl acrylate was replaced with 41.0 g (0.32 mol) of butyl acrylate, and 538.8 g of water with 529.9 g of water. As a result, the following was obtained: a milky-white dispersion liquid of pH-responsive polymer microparticle c (solid content concentration: 23.7% by mass).

Synthesis Example A4

Synthesis of pH-Responsive Polymer Microparticle d

As for the synthesis of pH-responsive polymer microparticle b in Synthesis Example A2, the reaction took place in a similar way to that in Synthesis Example A2 except: 227.2 g of the polymer solution of methacryloyloxyethyl trimethyl ammonium chloride containing a terminal vinylbenzyl group [As a repeating unit of methacryloyloxyethyl trimethyl ammonium chloride, 0.29 mol (determined based on the previous preparation)], 108.6 g (0.58 mol) of dimethylaminoethyl methacrylate, 29.0 g (0.29 mol) of ethyl acrylate, and 554.1 g of water. As a result, the following was obtained: a milky-white dispersion liquid of pH-responsive polymer microparticle d (solid content concentration: 22.8% by mass).

Synthesis Example A5

Synthesis of pH-Responsive Polymer Microparticle e

As for the synthesis of pH-responsive polymer microparticle d in Synthesis Example A4, the reaction took place in a similar way to that in Synthesis Example A4 except that: 29.0 g (0.29 mol) of ethyl acrylate was replaced with 37.1 g (0.29 mol) of butyl acrylate, and 554.1 g of water with 546.0 g of water. As a result, the following was obtained: a milky-white dispersion liquid of pH-responsive polymer microparticle e (solid content concentration: 23.7% by mass).

Comparative Synthesis Example A1

As for the synthesis of pH-responsive polymer microparticle b in Synthesis Example A2, the reaction took place in a similar way to that in Synthesis Example A2 except: 494.0 g of the polymer solution of methacryloyloxyethyl trimethyl ammonium chloride containing a terminal vinylbenzyl group [As a repeating unit of methacryloyloxyethyl trimethyl ammonium chloride, 0.65 mol (determined based on the previous preparation)], 65.1 g (0.65 mol) of ethyl acrylate, and 359.8 g of water. As a result, the following was obtained: a milky-white dispersion liquid of polymer microparticle (solid content concentration: 23.5% by mass).

Comparative Synthesis Example A2

As for the synthesis of pH-responsive polymer microparticle a in Comparative Synthesis Example A1, the reaction took place in a similar way to that in Comparative Synthesis Example A1 except: 440.8 g of the polymer solution of methacryloyloxyethyl trimethyl ammonium chloride containing a terminal vinylbenzyl group [As a repeating unit of methacryloyloxyethyl trimethyl ammonium chloride, 0.58 mol (determined based on the previous preparation)], 74.3 g (0.58 mol) of butyl acrylate, and 403.8 g of water. As a result, the following was obtained: a milky-white dispersion liquid of polymer microparticle (solid content concentration: 22.9% by mass).

Comparative Synthesis Example A3

A gel microparticle (or a gel microparticle made by crosslinking dimethylamino methacrylate with N,N-methylenebisacrylamide), disclosed in Example 1 of Japanese Patent No. 3155318, was produced and used. At pH 5, the average particle diameter of the produced gel microparticle (pH-responsive polymer microparticle) was 380 nm.

Figure 8:
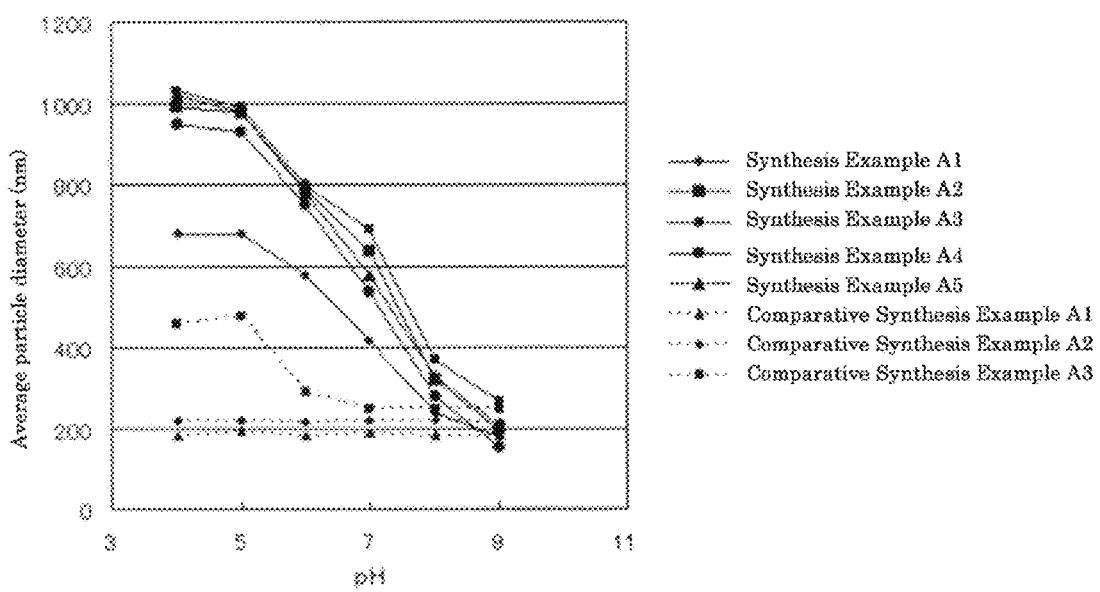
FIG. 8 is a diagram showing relation between pH and average particle diameter of polymer microparticles in Synthesis Examples A1, A2, A3, A4, and A5, and Comparative Synthesis Examples A1, A2, and A3, in which a monomer represented by the general formula (2) is used.

FIG. 8 shows the relation between pH and average particle diameter of polymer microparticles in Synthesis Examples A1 to A5 and Comparative Synthesis Examples A1 to A3, which were obtained as described above.

According to the results shown in FIG. 8, the average particle diameters of the pH-responsive polymer microparticles of the present invention were 100 nm to 300 nm when the pH was 8.5 or higher. As the pH became lower, the average particle diameters became significantly larger.

In the case of a conventional technique, or in the case of the pH-responsive polymer microparticle of Comparative Synthesis Example A3 for example, the particle diameter was small when the pH was high. As the pH became lower, the average particle diameter became gradually larger. However, the change in the average particle diameter was smaller than that of the present invention. That is, in the case of the pH-responsive polymer microparticle of the present invention, as the pH became lower, the average particle diameter started to become larger even at a relatively high level of pH. It is clear that, at the time of saturation, a change in the average particle diameter was large. Meanwhile, in the case of the polymer microparticles of Comparative Synthesis Examples A1 and A2 that did not have the pH-sensitive monomer represented by the general formula (3) that was an essential component of the present invention, it is clear that the average particle diameter remained unchanged even as the pH was changed.

Examples A1 to A24, Comparative Examples A1 to A11

Production Method of Inkjet Recording Ink

Tables 6 to 9 below show the configuration of the ink composition in Examples A1 to A24, and Tables 10 and 11 below show the configuration of the ink composition in Comparative Examples A1 to A11. Incidentally, the values in the tables are expressed in % by mass.

With the use of pigment dispersions in Preparation Examples and polymer microparticles in Synthesis Examples, the inks were prepared. The inks were stirred for one and a half hours, and were filtered with a membrane filter with a pore diameter of 1.2 μm. In this manner, each ink was obtained.

Incidentally, abbreviations and the like in Tables 6 to 9 mean:

Polyurethane emulsion: Manufactured by DIC Corporation, HYDRAN APX-101H, Solid content: 45% by mass, Average particle diameter: 160 nm, Minimum film forming temperature (MFT): 20° C.

KF-643: Polyether-modified silicone compound (manufactured by Shin-Etsu Chemical Co., Ltd., Component: 100% by mass)

PROXEL GXL: Fungicide made up mainly of 1,2-benzisothiazolin-3-one (manufactured by Avecia Ltd., Component: 20% by mass, containing dipropylene glycol).

TABLE 6

| | Ink composition | Ex. A1 | Ex. A2 | Ex. A3 | Ex. A4 | Ex. A5 | Ex. A6 |
|---|---|---|---|---|---|---|---|
| Pigment dispersion | Black pigment dispersion | 44.4 | 44.4 | 44.4 | 44.4 | 44.4 | 44.4 |
| | Cyan pigment dispersion | | | | | | |
| | Magenta pigment dispersion | | | | | | |
| | Yellow pigment dispersion | | | | | | |
| pH-responsive polymer microparticle | Synthesis Example A1 | 0.2 | | | | | |
| | Synthesis Example A2 | | 0.2 | | | | 0.05 |
| | Synthesis Example A3 | | | 0.2 | | | |
| | Synthesis Example A4 | | | | 0.2 | | |
| | Synthesis Example A5 | | | | | 0.2 | |
| Water-dispersible resin | Polyurethane emulsion | 2.5 | 2.5 | 2.5 | 2.5 | 2.5 | 2.5 |
| Wetting agent | 1,3-butanediol | 15 | 15 | 15 | 15 | 15 | 15 |
| | glycerin | 20 | 20 | 20 | 20 | 20 | 20 |
| Penetrating agent | 2-ethyl-1,3-hexanediol | 1.0 | 1.0 | 1.0 | 1.0 | 1.0 | 1.0 |
| | 2,2,4-trimethyl-1,3-pentanediol | 1.0 | 1.0 | 1.0 | 1.0 | 1.0 | 1.0 |
| Surfactant | KF-643 | 1.0 | 1.0 | 1.0 | 1.0 | 1.0 | 1.0 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | 14.55 | 14.55 | 14.55 | 14.55 | 14.55 | 14.7 |
| Total (%) | | 100 | 100 | 100 | 100 | 100 | 100 |

TABLE 7

| | Ink composition | Ex. A7 | Ex. A8 | Ex. A9 | Ex. A10 | Ex. A11 | Ex. A12 |
|---|---|---|---|---|---|---|---|
| Pigment dispersion | Black pigment dispersion | 44.4 | 44.4 | 44.4 | 44.4 | 44.4 | 44.4 |
| | Cyan pigment dispersion | | | | | | |
| | Magenta pigment dispersion | | | | | | |
| | Yellow pigment dispersion | | | | | | |
| pH-responsive polymer microparticle | Synthesis Example A1 | | | 0.05 | 1.0 | | |
| | Synthesis Example A2 | 1.0 | | | | | |
| | Synthesis Example A3 | | | | | | 0.05 |
| | Synthesis Example A4 | | | | | | |
| | Synthesis Example A5 | | | | 0.05 | 1.0 | |
| Water-dispersible resin | Polyurethane emulsion | 2.5 | 2.5 | 2.5 | 2.5 | 2.5 | 2.5 |
| Wetting agent | 1,3-butanediol | 15 | 15 | 15 | 15 | 15 | 15 |
| | glycerin | 20 | 20 | 20 | 20 | 20 | 20 |

TABLE 7-continued

|  | Ink composition | Ex. A7 | Ex. A8 | Ex. A9 | Ex. A10 | Ex. A11 | Ex. A12 |
|---|---|---|---|---|---|---|---|
| Penetrating agent | 2-ethyl-1,3-hexanediol | 1.0 | 1.0 | 1.0 | 1.0 | 1.0 | 1.0 |
|  | 2,2,4-trimethyl-1,3-pentanediol | 1.0 | 1.0 | 1.0 | 1.0 | 1.0 | 1.0 |
| Surfactant | KF-643 | 1.0 | 1.0 | 1.0 | 1.0 | 1.0 | 1.0 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | 13.75 | 14.7 | 13.75 | 14.7 | 13.75 | 14.7 |
| Total (%) |  | 100 | 100 | 100 | 100 | 100 | 100 |

TABLE 8

|  | Ink composition | Ex. A13 | Ex. A14 | Ex. A15 | Ex. A16 | Ex. A17 | Ex. A18 |
|---|---|---|---|---|---|---|---|
| Pigment dispersion | Black pigment dispersion | 44.4 |  |  |  |  |  |
|  | Cyan pigment dispersion |  | 33.3 |  |  | 33.3 |  |
|  | Magenta pigment dispersion |  |  | 33.3 |  |  | 33.3 |
|  | Yellow pigment dispersion |  |  |  | 33.3 |  |  |
| pH-responsive polymer microparticle | Synthesis Example A1 |  |  |  |  | 0.2 |  |
|  | Synthesis Example A2 |  | 0.2 | 0.2 | 0.2 |  |  |
|  | Synthesis Example A3 | 1.0 |  |  |  |  | 0.2 |
|  | Synthesis Example A4 |  |  |  |  |  |  |
|  | Synthesis Example A5 |  |  |  |  |  |  |
| Water-dispersible resin | Polyurethane emulsion | 2.5 | 2.5 | 2.5 | 2.5 | 2.5 | 2.5 |
| Wetting agent | 1,3-butanediol | 15 | 15 | 15 | 15 | 15 | 15 |
|  | glycerin | 20 | 20 | 20 | 20 | 20 | 20 |
| Penetrating agent | 2-ethyl-1,3-hexanediol | 1.0 | 2.0 | 2.0 | 2.0 | 2.0 | 2.0 |
|  | 2,2,4-trimethyl-1,3-pentanediol | 1.0 | 0 | 0 | 0 | 0 | 0 |
| Surfactant | KF-643 | 1.0 | 1.0 | 1.0 | 1.0 | 1.0 | 1.0 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | 13.75 | 25.65 | 25.65 | 25.65 | 25.65 | 25.65 |
| Total (%) |  | 100 | 100 | 100 | 100 | 100 | 100 |

TABLE 9

|  | Ink composition | Ex. A19 | Ex. A20 | Ex. A21 | Ex. A22 | Ex. A23 | Ex. A24 |
|---|---|---|---|---|---|---|---|
| Pigment dispersion | Black pigment dispersion |  |  |  |  |  |  |
|  | Cyan pigment dispersion |  | 33.3 | 33.3 |  |  | 33.3 |
|  | Magenta pigment dispersion |  |  |  | 33.3 |  |  |
|  | Yellow pigment dispersion | 33.3 |  |  |  |  |  |
| pH-responsive polymer microparticle | Synthesis Example A1 |  |  |  |  | 33.3 | 0.05 |
|  | Synthesis Example A2 |  |  |  |  |  |  |
|  | Synthesis Example A3 |  |  | 1.0 |  |  |  |
|  | Synthesis Example A4 | 0.2 |  |  | 0.05 |  |  |
|  | Synthesis Example A5 |  | 0.2 |  |  | 1.0 |  |
| Water-dispersible resin | Polyurethane emulsion | 2.5 | 2.5 | 2.5 | 2.5 | 2.5 | 2.5 |
| Wetting agent | 1,3-butanediol | 15 | 15 | 15 | 15 | 15 | 15 |
|  | glycerin | 20 | 20 | 20 | 20 | 20 | 20 |
| Penetrating agent | 2-ethyl-1,3-hexanediol | 2.0 | 2.0 | 2.0 | 2.0 | 2.0 | 2.0 |
|  | 2,2,4-trimethyl-1,3-pentanediol | 0 | 0 | 0 | 0 | 0 | 0 |
| Surfactant | KF-643 | 1.0 | 1.0 | 1.0 | 1.0 | 1.0 | 1.0 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | 25.65 | 25.65 | 24.85 | 25.8 | 24.85 | 25.8 |
| Total (%) |  | 100 | 100 | 100 | 100 | 100 | 100 |

TABLE 10

|  | Ink composition | Comp Ex. A1 | Comp Ex. A2 | Comp Ex. A3 | Comp Ex. A4 | Comp Ex. A5 |
|---|---|---|---|---|---|---|
| Pigment dispersion | Black pigment dispersion | 44.4 | 44.4 | 44.4 | 44.4 | 44.4 |
|  | Cyan pigment dispersion |  |  |  |  |  |
|  | Magenta pigment dispersion |  |  |  |  |  |
|  | Yellow pigment dispersion |  |  |  |  |  |

TABLE 10-continued

|  | Ink composition | Comp Ex. A1 | Comp Ex. A2 | Comp Ex. A3 | Comp Ex. A4 | Comp Ex. A5 |
|---|---|---|---|---|---|---|
| Polymer microparticle | Comparative Synthesis Example A1 | 0.2 |  |  | 2.0 |  |
|  | Comparative Synthesis Example A2 |  | 0.2 |  |  |  |
|  | Comparative Synthesis Example A3 |  |  | 0.2 |  | 2.0 |
| Water-dispersible resin | Polyurethane emulsion | 2.5 | 2.5 | 2.5 | 2.5 | 2.5 |
| Wetting agent | 1,3-butanediol | 15 | 15 | 15 | 15 | 15 |
|  | glycerin | 20 | 20 | 20 | 20 | 20 |
| Penetrating agent | 2-ethyl-1,3-hexanediol | 1.0 | 1.0 | 1.0 | 1.0 | 2.0 |
|  | 2,2,4-trimethyl-1,3-pentanediol | 1.0 | 1.0 | 1.0 | 1.0 | 1.0 |
| Surfactant | KF-643 | 1.0 | 1.0 | 1.0 | 1.0 | 1.0 |
| Fungicide | PROXEL GXL | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 |
| Water | Pure water | 14.55 | 14.55 | 14.55 | 12.75 | 11.75 |
| Total (%) |  | 100 | 100 | 100 | 100 | 100 |

TABLE 11

|  | Ink composition | Comp Ex. A6 | Comp. Ex. A7 | Comp Ex. A8 | Comp Ex. A9 | Comp Ex. A10 | Comp Ex. A11 |
|---|---|---|---|---|---|---|---|
| Pigment dispersion | Black pigment dispersion |  |  |  |  |  |  |
|  | Cyan pigment dispersion | 33.3 |  |  | 33.3 |  |  |
|  | Magenta pigment dispersion |  | 33.3 |  |  | 33.3 |  |
|  | Yellow pigment dispersion |  |  | 33.3 |  |  | 33.3 |
| Polymer microparticle | Comparative Synthesis Example A1 | 0.2 |  |  | 2.0 |  |  |
|  | Comparative Synthesis Example A2 |  | 0.2 |  |  | 2.0 |  |
|  | Comparative Synthesis Example A3 |  |  | 0.2 |  |  | 2.0 |
| Water-dispersible resin | Polyurethane emulsion | 2.5 | 2.5 | 2.5 | 2.5 | 2.5 | 2.5 |
| Wetting agent | 1,3-butanediol | 15 | 15 | 15 | 15 | 15 | 15 |
|  | glycerin | 20 | 20 | 20 | 20 | 20 | 20 |
| Penetrating agent | 2-ethyl-1,3-hexanediol | 2.0 | 2.0 | 2.0 | 2.0 | 2.0 | 2.0 |
|  | 2,2,4-trimethyl-1,3-pentanediol | 0 | 0 | 0 | 0 | 0 | 0 |
| Surfactant | KF-643 | 1.0 | 1.0 | 1.0 | 1.0 | 1.0 | 1.0 |
| Fungicide | PROXEL GXL | 0.05 | 0.05 | 0.05 | 0.05 | 0.05 | 0.05 |
| pH adjuster | 2-amino-2-ethyl-1,3-propanediol | 0.3 | 0.3 | 0.3 | 0.3 | 0.3 | 0.3 |
| Water | Pure water | 25.65 | 25.65 | 25.65 | 23.85 | 23.85 | 23.85 |
| Total (%) |  | 100 | 100 | 100 | 100 | 100 | 100 |

The key points of Examples A1 to A24 and Comparative Examples A1 to A11 are shown below:

Examples A1 to A5 were the case where the pH-responsive polymer microparticles of Synthesis Examples A1 to A5 were used for a carbon black pigment dispersion liquid;

Examples A6 to A13 were the case where, in the carbon black pigment dispersion liquid, the amounts of the pH-responsive polymer microparticles of Synthesis Examples were decreased or increased within a preferred range;

Examples A14 to A20 were the case where the pH-responsive polymer microparticles of Synthesis Examples A1 to A5 were used for a color pigment dispersion liquid;

Examples A21 to A24 were the case where, in the color pigment dispersion liquid, the amounts of the pH-responsive polymer microparticles of Synthesis Examples were decreased or increased within a preferred range;

Comparative Examples A1 to A3, corresponding to Examples A1 to A5, were the case where a polymer microparticle that did not have the pH-sensitive monomer represented by the general formula (3) was used (Comparative Examples A1 and A2), and the case where the pH-responsive polymer microparticle disclosed in Japanese Patent No. 3155318 was used (Comparative Synthesis Example A3);

Comparative Examples A4 and A5 were comparative examples corresponding to Examples A6 to A13;

Comparative Examples A6 to A8 were comparative examples corresponding to Examples A14 to A20; and Comparative Examples A9 to A11 were comparative examples corresponding to Examples A21 to A24.

Then, by an evaluation method described later, the inkjet recording inks of Examples A1 to A24 and Comparative Examples A1 to A11 were evaluated. Table 12 below shows the results.

<Image Density>

Under a 23° C., 50% RH environment, an inkjet printer (IPSIO GX5000, manufactured by Ricoh Co., Ltd.) was filled with the produced inks. A chart that had 64-point character "■," which was created by Microsoft Word 2000 (manufactured by Microsoft), was printed on MYPAPER (manufactured by NBS Ricoh Co., Ltd.). The color of the portion "■" on the printed surface was measured by X-Rite938 (manufactured by X-Rite, Inc.), and was assessed based on the following evaluation criteria.

As for the print mode, the mode "Plain paper-Standard fast" was modified by an accompanying printer driver in user settings of plain paper so as to have "no color correction." The modified mode was used.

[Evaluation Criteria]

A: Black: 1.2 or higher, Magenta: 0.95 or higher
  Cyan: 0.95 or higher, Yellow: 0.8 or higher
B: Black: 1.15 or higher, Magenta: 0.9 or higher
  Cyan: 0.9 or higher, Yellow: 0.75 or higher
C: Black: 1.1 or higher, Magenta: 0.85 or higher
  Cyan: 0.85 or higher, Yellow: 0.7 or higher
D: Black: less than 1.1, Magenta: less than 0.85
  Cyan: less than 0.85, Yellow: less than 0.7

As for <Ink storage stability>, <Ink jetting stability>, and <Tendency of fixation to nozzle>, the inks were assessed in a similar way to those in Examples 1 to 12 and Comparative Examples 1 to 10.

TABLE 12

| Examples | Image density | Ink storage stability | Ink jetting stability | Tendency of fixation to nozzle |
|---|---|---|---|---|
| Example A1 | A | A | A | A |
| Example A2 | A | A | A | A |
| Example A3 | A | A | A | A |
| Example A4 | A | A | A | A |
| Example A5 | A | A | A | A |
| Example A6 | B | A | A | A |
| Example A7 | A | A | A | A |
| Example A8 | B | A | A | A |
| Example A9 | A | A | A | A |
| Example A10 | B | A | A | A |
| Example A11 | A | A | A | A |
| Example A12 | B | A | A | A |
| Example A13 | A | A | A | A |
| Example A14 | A | A | A | A |
| Example A15 | A | A | A | A |
| Example A16 | A | A | A | A |
| Example A17 | A | A | A | A |
| Example A18 | A | A | A | A |
| Example A19 | A | A | A | A |
| Example A20 | A | A | A | A |
| Example A21 | A | A | A | A |
| Example A22 | B | A | A | A |
| Example A23 | A | A | A | A |
| Example A24 | B | A | A | A |
| Comp. Example 1 | D | A | A | A |
| Comp. Example 2 | D | A | A | A |
| Comp. Example 3 | D | B | A | A |
| Comp. Example 4 | D | B | B | B |
| Comp. Example 5 | C | C | C | C |
| Comp. Example 6 | D | A | A | A |
| Comp. Example 7 | D | A | A | A |
| Comp. Example 8 | D | B | A | A |
| Comp. Example 9 | D | B | B | B |
| Comp. Example 10 | D | B | B | B |
| Comp. Example 11 | C | C | C | C |

According to the evaluation results, the ink of the present invention, which contains, as an element of the ink composition, a pH-responsive polymer microparticle that is a copolymer of the hydrophobic monomer represented by the general formula (2), the pH-sensitive monomer represented by the general formula (3), and the hydrophilic macromonomer represented by the general formula (4), is excellent in image density, ink storage stability, ink jetting stability, and tendency of fixation to nozzle. Characteristics that could be problematic in practical use are not confirmed.

For example, when a comparison is made between Examples A1 to A5, A6 to A13, A14 to A20, and A21 to A24 and Comparative Examples A1 to A3, A4 and A5, A6 to A8, and A9 to A11, it is clear that each of the color inks of the present invention is definitely excellent in image density due to the effects of the pH-responsive polymer microparticle; and that the color inks have the same levels, or higher levels, of ink storage stability, ink jetting stability, and tendency of fixation to nozzle.

Moreover, it is clear that, even if the amount of the pH-responsive polymer microparticle is a lower limit of a preferred range (Examples A6, A8, A10, A12, A22, and A24), the performance of the ink is not problematic, and is sufficient in practical use. It is also clear that, even if the amount of the pH-responsive polymer microparticle is close to an upper limit of the preferred range (Examples A7, A9, A11, A13, A21, and A23), the same advantageous effects as those in Examples A1 to A5 and A14 to A20 can be obtained.

As described above, according to the present invention, the ink is excellent in storage stability and drying characteristics; is able to obtain high image density on plain paper or coated paper for printing; is excellent in jetting stability of ink from a recording head; and does not allow fixation of ink around a nozzle. Therefore, the present invention can be applied to various types of recording associated with an inkjet recording method. The ink recorded matter of the present invention can provide a high-quality unblurred image, and is excellent in stability over time, and can be suitably used in various applications, such as materials on which various characters or images are recorded. As for recording devices that use the inkjet recording method, for example, the following are applicable: inkjet recording printers, fax machines, copying machines, and printer/fax/copier combined machines.

The following show aspects of the present invention:

<1> An inkjet recording ink, including:
  water;
  a wetting agent;
  a colorant; and
  polymer microparticles,
  wherein the polymer microparticles are each a copolymer of a monomer represented by the following structural formula (1) or the following general formula (2), a monomer represented by the following general formula (3), and a macromonomer represented by the following general formula (4).

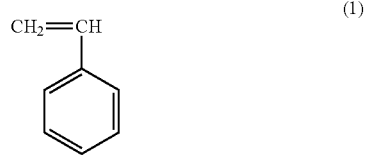

(1)

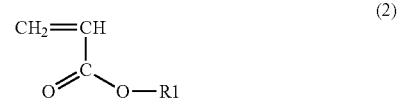

(2)

In the general formula (2), "R1" is an alkyl group having 1 to 4 carbon atoms.

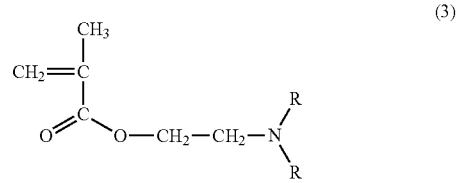

(3)

In the general formula (3), "Rs" are independently an alkyl group having 1 to 4 carbon atoms.

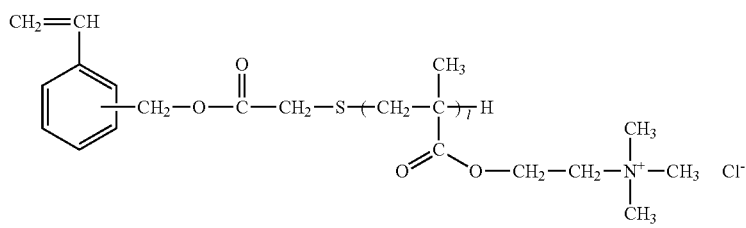

(4)

In the general formula (4), "l" is the number of repeating units, and an integer of 1 to 100.

<2> The inkjet recording ink according to <1>,
wherein in the general formula (3), the "Rs" are independently a methyl group or an ethyl group.

<3> The inkjet recording ink according to <1> or <2>,
wherein in the general formula (4), "l" is an integer of 1 to 50.

<4> The inkjet recording ink according to any one of <1> to <3>,
wherein a ratio of the monomer represented by the structural formula (1) or the general formula (2): the monomer represented by the general formula (3): the repeating units in the macromonomer represented by the general formula (4) is 1: (0.1 to 5): (0.1 to 5).

<5> The inkjet recording ink according to any one of <1> to <4>,
wherein an amount of the polymer microparticles relative to a total amount of the inkjet recording ink is 0.05% by mass to 2.0% by mass as a solid content of the polymer microparticles.

<6> An ink cartridge, including:
the inkjet recording ink according to any one of <1> to <5>; and
a container, which houses the inkjet recording ink.

<7> An inkjet recording method, including:
applying a stimulus, through an ink jetting unit, to the inkjet recording ink according to any one of <1> to <5> to jet the ink from a recording head and record an image on a recording medium.

<8> An inkjet recording device, including:
an ink jetting unit configured to jet the inkjet recording ink according to any one of <1> to <5> from a recording head to record an image on a recording medium.

<9> An ink recorded matter, including:
an image recorded with the inkjet recording ink according to any one of <1> to <5>; and
a recording medium, containing the image thereon.

This application claims priority to Japanese application No. 2012-061815, filed on Mar. 19, 2012 and Japanese application No. 2012-276520, filed on Dec. 19, 2012, and incorporated herein by reference.

What is claimed is:

1. An inkjet recording ink, comprising:
water;
a wetting agent;
a colorant; and
polymer microparticles,
wherein the polymer microparticles are each a copolymer of a monomer represented by formula (1) or formula (2), a monomer represented by formula (3), and a macromonomer represented by formula (4):

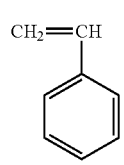

(1)

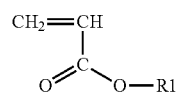

(2)

where "R1" is an alkyl group comprising 1 to 4 carbon atoms,

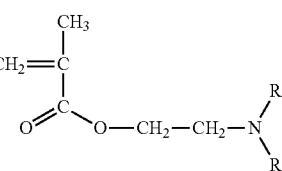

(3)

where each "R" is independently an alkyl group comprising 1 to 4 carbon atoms,

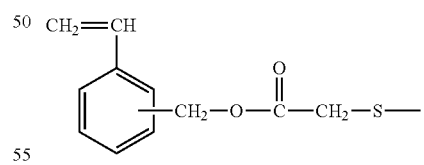

(4)

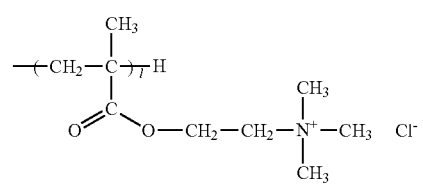

where "l" is the number of repeating units, and an integer of 1 to 100, and wherein an amount of the polymer microparticles relative to a total amount of the inkjet recording ink is 0.05% by mass to 2.0% by mass as a solid content of the polymer microparticles.

2. The inkjet recording ink according to claim 1,
wherein in the formula (3), each "R" is independently a methyl group or an ethyl group.

3. The inkjet recording ink according to claim 1,
wherein in the formula (4), "l" is an integer of 1 to 50.

4. The inkjet recording ink according to claim 1,
wherein a ratio of the monomer represented by the formula (1) or the formula (2):the monomer represented by the formula (3):the repeating units in the macromonomer represented by the formula (4) is 1:(0.1 to 5):(0.1 to 5).

5. An ink cartridge, comprising:
an inkjet recording ink; and
a container, which houses the inkjet recording ink,
wherein the inkjet recording ink comprises:
water;
a wetting agent;
a colorant; and
polymer microparticles,
wherein the polymer microparticles are each a copolymer of a monomer represented by formula (1) or formula (2), a monomer represented by formula (3), and a macromonomer represented by formula (4):

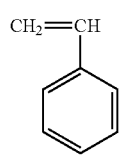

(1)

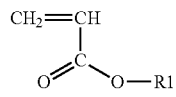

(2)

where "R1" is an alkyl group comprising 1 to 4 carbon atoms,

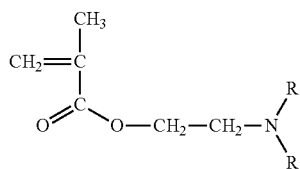

(3)

where each "R" is independently an alkyl group comprising 1 to 4 carbon atoms,

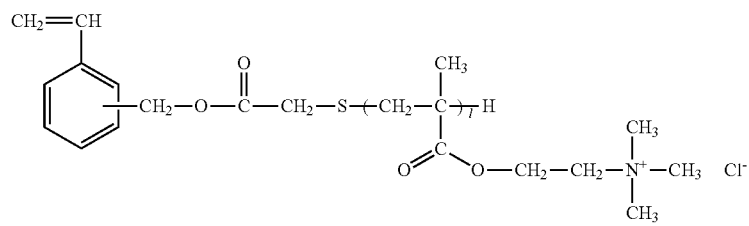

(4)

where "l" is the number of repeating units, and an integer of 1 to 100, and
wherein an amount of the polymer microparticles relative to a total amount of the inkjet recording ink is 0.05% by mass to 2.0% by mass as a solid content of the polymer microparticles.

6. The ink cartridge according to claim 5,
wherein in the formula (3), each "R" is independently a methyl group or an ethyl group.

7. The ink cartridge according to claim 5,
wherein in the formula (4), "l" is an integer of 1 to 50.

8. The ink cartridge according to claim 5,
wherein a ratio of the monomer represented by the formula (1) or the formula (2):the monomer represented by the formula (3):the repeating units in the macromonomer represented by the formula (4) is 1:(0.1 to 5):(0.1 to 5).

9. An inkjet recording method, comprising:
applying a stimulus, through an ink jetting unit, to an inkjet recording ink to jet the ink from a recording head and record an image on a recording medium,
wherein the inkjet recording ink comprises:
water;
a wetting agent;
a colorant; and
polymer microparticles,
wherein the polymer microparticles are each a copolymer of a monomer represented by formula (1) or formula (2), a monomer represented by formula (3), and a macromonomer represented by formula (4):

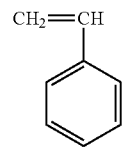

(1)

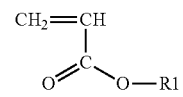

(2)

where "R1" is an alkyl group comprising 1 to 4 carbon atoms,

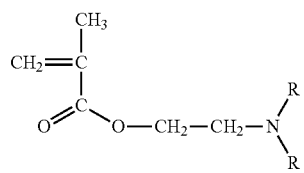

(3)

where each "R" is independently an alkyl group comprising 1 to 4 carbon atoms,

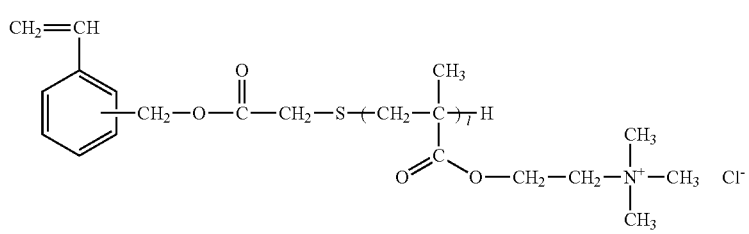

where "l" is the number of repeating units, and an integer of 1 to 100, and
wherein an amount of the polymer microparticles relative to a total amount of the inkjet recording ink is 0.05% by mass to 2.0% by mass as a solid content of the polymer microparticles.

10. The inkjet recording method according to claim 9, wherein in the formula (3), each "R" is independently a methyl group or an ethyl group.

11. The inkjet recording method according to claim 9, wherein in the formula (4), "l" is an integer of 1 to 50.

12. The inkjet recording method according to claim 9, wherein a ratio of the monomer represented by the formula (1) or the formula (2), the monomer represented by the formula (3), and the repeating units in the macromonomer represented by formula (4) is 1:(0.1 to 5):(0.1 to 5).

* * * * *